US010743169B2

(12) United States Patent
Dames et al.

(10) Patent No.: US 10,743,169 B2
(45) Date of Patent: *Aug. 11, 2020

(54) SITUATIONAL AWARENESS SYSTEMS AND METHODS

(71) Applicant: Coolfire Solutions, Inc., St. Louis, MO (US)

(72) Inventors: John J. Dames, St. Louis, MO (US); Michael S. Biviano, St. Louis, MO (US)

(73) Assignee: Coolfire Solutions, Inc., St. Loui, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/591,197

(22) Filed: Oct. 2, 2019

(65) Prior Publication Data
US 2020/0053540 A1 Feb. 13, 2020

Related U.S. Application Data

(63) Continuation-in-part of application No. 16/192,742, filed on Nov. 15, 2018, which is a continuation of (Continued)

(51) Int. Cl.
*H04M 11/04* (2006.01)
*H04W 4/90* (2018.01)
(Continued)

(52) U.S. Cl.
CPC ............ *H04W 4/90* (2018.02); *H04L 67/12* (2013.01); *H04L 67/18* (2013.01); *H04L 67/20* (2013.01);
(Continued)

(58) Field of Classification Search
CPC ........ G06N 3/0445; G06N 3/04; H04L 67/12; H04L 1/0041; H04L 45/38; H04W 4/029;
(Continued)

(56) References Cited

U.S. PATENT DOCUMENTS 8,823,507 B1  9/2014  Touloumtzis
9,026,148 B1  5/2015  White et al.
(Continued)

FOREIGN PATENT DOCUMENTS

EP   2805316 A1   11/2014
WO  2013071157 A1   5/2013
WO  2017008861 A1   1/2017

OTHER PUBLICATIONS

International Search Report, International Patent Application No. PCT/US2019/023683, dated Jul. 5, 2019 (13 pages).

*Primary Examiner* — Khalid W Shaheed
(74) *Attorney, Agent, or Firm* — Lewis Rice LLC

(57) ABSTRACT

Systems and methods for computer-aided, session-based operational and organizational responses to asynchronously occurring events. A "session" is a collection of client-server connections, each client connection being an endpoint device in a pool of devices under the control of the members of a defined operational response team cooperating to address an event. The session provides an organizational framework for information sharing, including using context roles to identify the proper recipients for data and messages. The information and data is shared to participating recipients in the session in real-time as the operational response is conducted, and as new data and information is generated, that data is added to the session with a timestamp. Once the response is concluded, the sessions can be closed, encapsulating the data, which can then be "played" back to re-experience the response as it played out, such as for audit, analysis, and review purposes.

12 Claims, 9 Drawing Sheets

Related U.S. Application Data application No. 15/933,088, filed on Mar. 22, 2018, now Pat. No. 10,136,296.

(51) Int. Cl.
*H04W 4/029* (2018.01)
*H04W 4/02* (2018.01)
*H04W 4/024* (2018.01)
*H04L 29/08* (2006.01)
*H04W 4/38* (2018.01)
*G06Q 10/06* (2012.01)

(52) U.S. Cl.
CPC ............ H04L 67/26 (2013.01); H04L 67/306 (2013.01); H04W 4/023 (2013.01); H04W 4/024 (2018.02); H04W 4/029 (2018.02); *G06Q 10/06311* (2013.01); *H04W 4/38* (2018.02)

(58) Field of Classification Search
CPC ... H04W 84/005; H04W 4/025; H04W 64/00; H04W 84/18
See application file for complete search history.

(56) References Cited

U.S. PATENT DOCUMENTS

| | | | |
|---|---|---|---|
| 9,867,023 | B2 | 1/2018 | Rauner |
| 10,136,296 | B1* | 11/2018 | Dames ................... H04W 4/90 |
| 2009/0125584 | A1* | 5/2009 | Agrawala ........... H04L 67/2814 709/203 |
| 2010/0217879 | A1* | 8/2010 | Weiner .................... H04L 41/12 709/228 |
| 2012/0232785 | A1 | 9/2012 | Wiesemann et al. |
| 2012/0239191 | A1 | 9/2012 | Versteeg et al. |
| 2014/0125483 | A1 | 5/2014 | Kane et al. |
| 2015/0024704 | A1 | 1/2015 | Titus et al. |
| 2015/0334545 | A1 | 11/2015 | Maier et al. |
| 2016/0109250 | A1 | 4/2016 | Baughman et al. |
| 2017/0118592 | A1 | 4/2017 | Patel et al. |
| 2017/0251347 | A1 | 8/2017 | Mehta et al. |
| 2018/0106626 | A1 | 4/2018 | Baughman et al. |
| 2018/0152403 | A1 | 5/2018 | Charignon |
| 2018/0310159 | A1* | 10/2018 | Katz .................... H04M 3/5116 |

* cited by examiner

SITUATIONAL AWARENESS SYSTEMS AND METHODS

CROSS-REFERENCE TO RELATED APPLICATIONS

This case is a Continuation-in-Part of U.S. patent application Ser. No. 16/192,742, filed Nov. 15, 2018, which is a Continuation of U.S. patent application Ser. No. 15/933,088, filed Mar. 22, 2018, and granted as U.S. Pat. No. 10,136,296, on Nov. 20, 2018. The entire disclosures of all the foregoing documents are incorporated herein by reference.

BACKGROUND OF THE INVENTION

Field of the Invention

This disclosure is related to the field of situational awareness. In particular, it relates to systems and methods for providing real-time situational awareness data to endpoint devices in a distributed telecommunications network.

Description of the Related Art

Situational awareness refers to the perception of events and context in space and/or time. This generally involves awareness of what is transpiring within the immediate vicinity of the person perceiving events, as well as developing an understanding of how information, events, context, and actions will affect the goals or objectives of an actor, individual, or organization, both in the short and long term.

Typically, situational awareness involves a projection into the future of the status of an individual after some variable has changed, such as the passage of time, or the occurrence of an event. Situation and awareness is a key field of study in a number of industries, particularly those that involve rapidly changing operational environments and high stakes, such as aviation, military operations, and emergency services. Early theoretical work on situational awareness was performed by Dr. Mica Endsley. See, e.g., Toward a Theory of Situation Awareness in Dynamic Systems, Human Factors, 37(1):32-64 (1995).

As shown in prior art FIG. 1A, the Endsley model described three stages of situational awareness formation: perception 100, comprehension 102, and projection 104. Under perception, the status, attributes and dynamics of the relevant elements in the environment or context are perceived. This generally involves monitoring, detecting, or recognizing factors or developments relevant to the circumstances, such as objects, events, people, systems, and environmental factors, as well as their current states or statuses, such as locations, conditions, actions, or roles.

The second stage, comprehension 102, involves making sense of the various elements perceived. This information often arrives in a disorganized and disjointed fashion and must be examined, organized, and harmonized to develop an understanding of how the information will in turn affect the objectives or purposes of actors within the system. This process generally involves the development of a comprehensive understanding of the environment relevant to the actor in question by synthesizing perceived data or through evaluation, pattern recognition, and interpretation.

The third stage is projection 104, which is the ability to project or predict the future actions or behaviors of the various elements in play in the system. This generally requires knowledge of the roles, status, and capabilities of the various actors and elements at issue, as well as comprehension of the overall situation. Data is extrapolated forward in time to determine how future states will be affected by a change in any particular variable in the operational environment, which is used to support decision-making 106. Once an action is performed 108, the system state changes and the process begins anew.

A common implementation of situation awareness is known in the prior art as the "OODA Loop," depicted in FIG. 1B. OODA is an acronym for "observe, orient, decide, and act." As shown in FIG. 1B, the observe 110 element roughly corresponds to perception 100 in the Endsley model. Orient 112 roughly corresponds to comprehension 102. The OODA loop adds the aspects of decision-making and action 116, which in turn result in changes to the system state (e.g., feedback 118) which may be observed 110, restarting the OODA loop process.

It is known in strategic applications, such as the military, that the "tighter" OODA loop one can achieve, the greater advantage one has over other actors in the same system. In other words, the more rapidly that one can incorporate feedback from actions into the next round of observations, orient in the new system state, and make decisions, the more one can obscure one's own intensions while also developing greater clarity and accuracy as to the intentions of others. Such information disparities have obvious advantages in military and other high-stakes strategic applications.

However, in practical terms, situational awareness presents a number of difficulties due to the rapid pace of information flow and the difficulty for any one actor to perceive, understand, and project the system state in real time in support of decision-making. While the processing power of computers can assist, it is difficult to develop a computing platform to support situational awareness, generally due to the disjointed and disorganized nature of the relevant data. The relevant factors for any given situation tend to vary wildly from one situation to the next, making it difficult for a computing platform to implement a data model relevant to all situations.

For example, an airline pilot is concerned about, among other things, the mechanical integrity of the aircraft, local weather, weather at the destination, weather located between the destination and the starting point, the well-being of the passengers and crew, the fuel level of the aircraft, and so forth. None of this data is available from a single source. Weather data may be available via the National Weather Service, air traffic controllers, aircraft-based radar, or direct observation. The status of passengers is monitored only anecdotally through verbal reports from the flight crew. Fuel level is monitored visually via a mechanical fuel gauge. Still other factors, such as pilot fatigue, are known only to the pilot. It is difficult for a computer-implemented platform to organize all of this information into a single situational awareness model. Moreover, any such model would be limited to the specific data sources relevant to a pilot in the specific situation of operating a commercial passenger aircraft. Not all of these factors would apply to otherwise similar situations, such as a cargo or military pilot.

Compare this scenario to, for example, a delivery driver delivering medical supplies to a hospital. The driver is concerned about the mechanical integrity of the delivery vehicle, the integrity of the cargo, the fuel level of the vehicle, fatigue, traffic and weather on the route, and so forth. While some of these factors overlap with the airline pilot, others do not. Moreover, even the factors that overlap may not be perceived or measured in the same manner. For example, the route of an airplane is determined by flight path information filed with the Federal Aviation Administration prior to takeoff and adherence to the plan is monitored, whereas a delivery driver may deviate from the route at will. The context-specific nature of situational awareness makes it very difficult to implement a computer-based decision support platform suitable for use across multiple industries.

Further complicating this, the trend in computational analytics is towards "big data," wherein massive data stores are collected and subjected to various data mining techniques to identify patterns and meaningful statistical information. Big data is generally characterized by the volume or nature of the data being too large or complex for processing via traditional data processing application software, and instead requiring anywhere from tens to thousands of computer servers to process.

Prior art FIG. 2 shows, at a very high level, the basic architecture of a traditional big data system. In the depicted system 101 of FIG. 2, a plurality of data sources 103 are monitored and tracked by a computer server 105, generally over a telecommunications network 107. The server 105 copies or stores data received from the data sources 103 in a database 109 and uses a high-powered computing platform, such as a server farm, to examine the database 109 and identify potentially meaningful predictive analytics 111. These analytics 111 are then used for decision-making or support 106, as identified, for example, in FIG. 1A. Feedback 113 may be provided as to the quality of the analytics 111. This feedback 113 in turn may be used in future data processing to refine the analytics 111.

By its nature, data mining is relatively slow and unresponsive to emergent situations. For example, considering the OODA loop, which the goal is the tightest possible turnaround, the time required to develop a useful data mining analysis of the current system state is long enough that by the time the analytics are available, the system state has already changed enough to render them irrelevant. Thus, the OODA loop cannot be tightened in a big data implementation.

Further, for a number of reasons, pattern recognition and other forms of data mining are often not suitable for use in decision support. First, the context of each decision is usually specific to the immediate situation, because, by definition, situational awareness circumstances are fluid and rapidly changing. There simply may not be enough (or any) data available to mine for pattern recognition. By way of a simple example, cyclical traffic patterns may be analyzed and projected using data mining techniques, but this does not predict or indicate the occurrence of any particular traffic accident or road closure, which is the context-specific observation 110 needed in the OODA loop to make routing decisions for a delivery driver.

Second, knowledge of the factors relevant to a given industry or circumstance is needed in order to implement a robust situational awareness decision support system. However, a software developer typically has familiarity with only a few industries and usually lacks the breadth of knowledge required to implement systems that can receive and process all required data for a particular situation. As each new user of the platform is added, new sources of data are needed to support the platform for that particular user, expanding the cost and complexity of the platform, and overwhelming real-time data processing capabilities and storage requirements. Further, each individual business within an industry will have its own unique command structure and workflow. Not only is the data itself difficult to model in a uniform platform, but also relationships and task management are likewise difficult to model. This in turn makes the system less responsive, defeating its ultimate purpose. This also can result in enterprises having to adapt or modify tried-and-true business processes to conform to the limited capabilities of the software platform.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a method for providing decision support to a user comprising: providing an endpoint device of a user; providing a server computer; at the server computer: associating an identifier with the user; associating a first context role identifier with the identifier; and associating an indication of an event context; the endpoint device transmitting to the server computer, at a predetermined frequency, a current geographic location of the endpoint device; receiving at the server computer an indication of an event associated with the event context and a geographic location of the event; and at the server computer, if the endpoint device is determined to be within a notification threshold distance of the event based on a comparison of the received current geographic location of the endpoint device to the geographic location of the event, transmitting to the endpoint device a notification message, the content of the message being determined based upon the first context role and the event context of the event.

In an embodiment of the method, the notification threshold distance of the event is received at the server from a third party data source.

In another embodiment of the method, the endpoint device comprises a mobile device of a user.

In another embodiment of the method, before the transmitting step, the endpoint device receives from the server computer a predetermined set of tasks assigned to the user.

In another embodiment of the method, the transmitting step further comprises the endpoint device transmitting to the server computer, at a predetermined frequency, a current geographic location of the endpoint device while the user performs the assigned set of tasks.

In another embodiment of the method, the transmitted message being determined based upon the first context role and the event context of the event.

In another embodiment of the method, the indication of an event associated with the event context and a geographic location of the event is received via a sensor communicably coupled to the server computer.

In another embodiment of the method, the sensor is selected from the group consisting of: an optical, light, imaging, or photon sensor; a motion or movement sensor; an electromagnetic sensor; an acoustic sensor; an automotive sensor; a chemical sensor; an electrical sensor; a magnetic sensor; a fluid sensor; a radiation sensor; a navigation instrument; an orientation or direction sensor; a pressure sensor; a thermal, heat, or temperature sensor; a force, density, or level sensor; a proximity or distance sensor; and an Internet-of-things device or sensor.

In another embodiment of the method, the indication of an event associated with the event context and a geographic location of the event is received via a third party data source communicably coupled to the server computer.

In another embodiment of the method, the indication of an event associated with the event context and a geographic location of the event is received via the endpoint device.

In another embodiment of the method, the endpoint device comprises a client application communicably coupled to at least one external data source.

In another embodiment of the method, the external data source comprises a third party point solution.

In another embodiment of the method, the event context comprises an urgent condition, the first context role identifier comprises a type of personnel trained to address the urgent condition, and the message comprises instructions for the user to address the urgent condition.

In another embodiment of the method, the event context comprises an urgent condition, the first context role identifier comprises a type of personnel not trained to address the urgent condition, and the message comprises instructions for the user to avoid the urgent condition.

In another embodiment of the method, the message comprises an identification of the event and a geographic location of the event.

The method of claim 15, wherein the endpoint device displays on a display of the endpoint device a map indicating the received geographic location of the event indicated in the message and the identification of the event.

In another embodiment of the method, the content of the message is further determined based upon a set of predefined rules.

In another embodiment of the method, the method further comprises: receiving at the server computer an indication of a change in the status of the event; and at the server computer, transmitting to the endpoint device a second notification message, the content of the second notification message being determined based upon the first context role and the event context of the event.

In another embodiment of the method, the transmitting step is performed automatically by the server computer.

In another embodiment of the method, the transmitting step is performed only after receiving at the server computer human-provided instructions to perform the transmitting step.

DESCRIPTION OF THE PREFERRED EMBODIMENT(S)

Figure 1A:
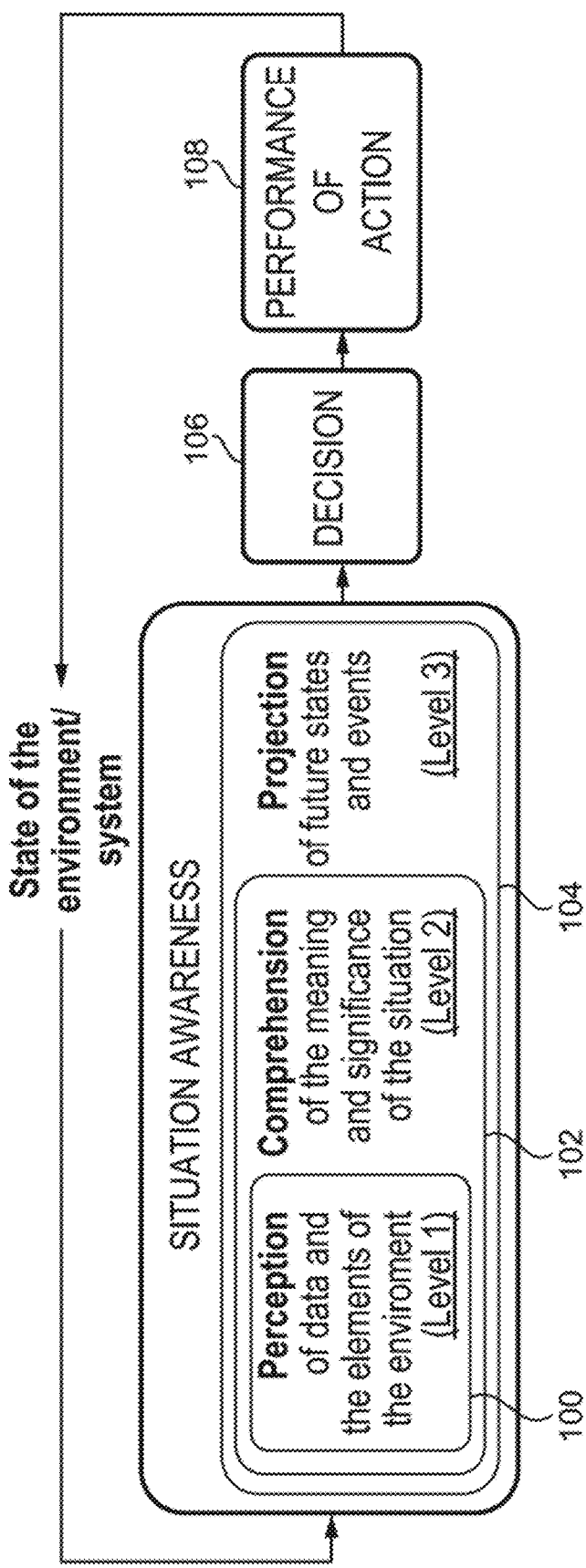
FIGS. 1A and 1B depict models of prior art situational awareness processes.
Figure 1B:
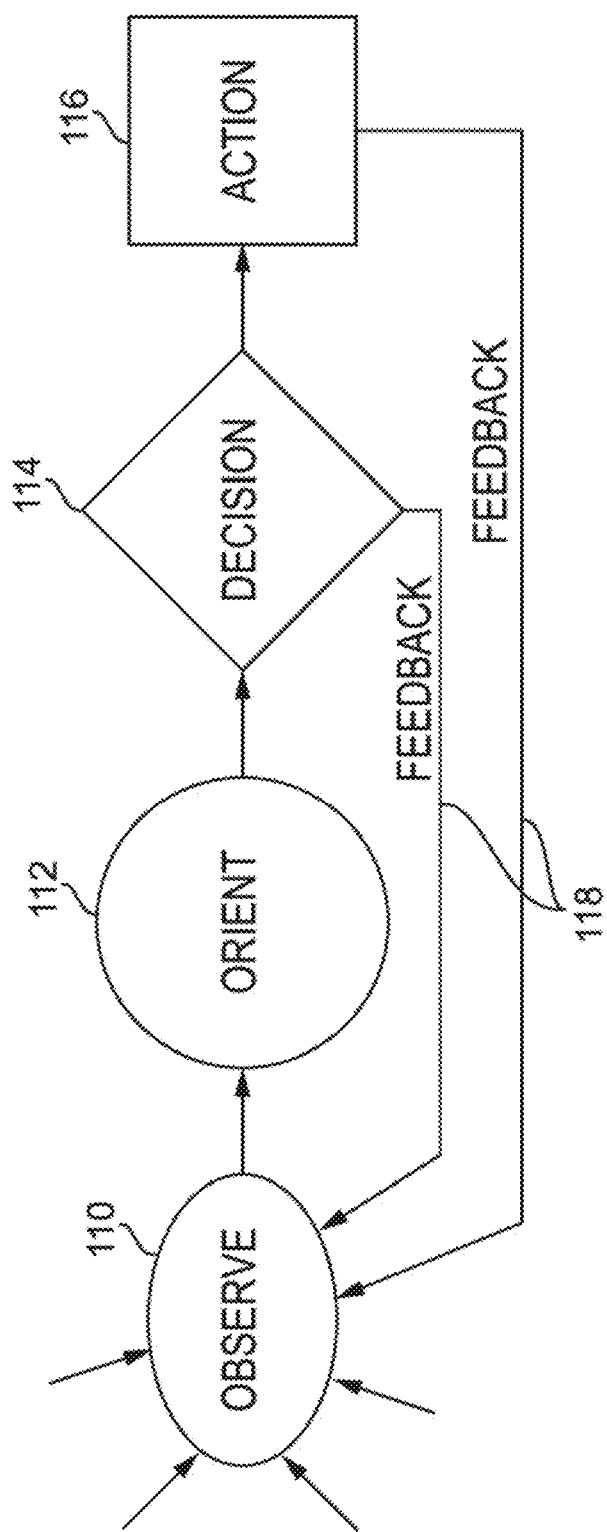
Figure 2:
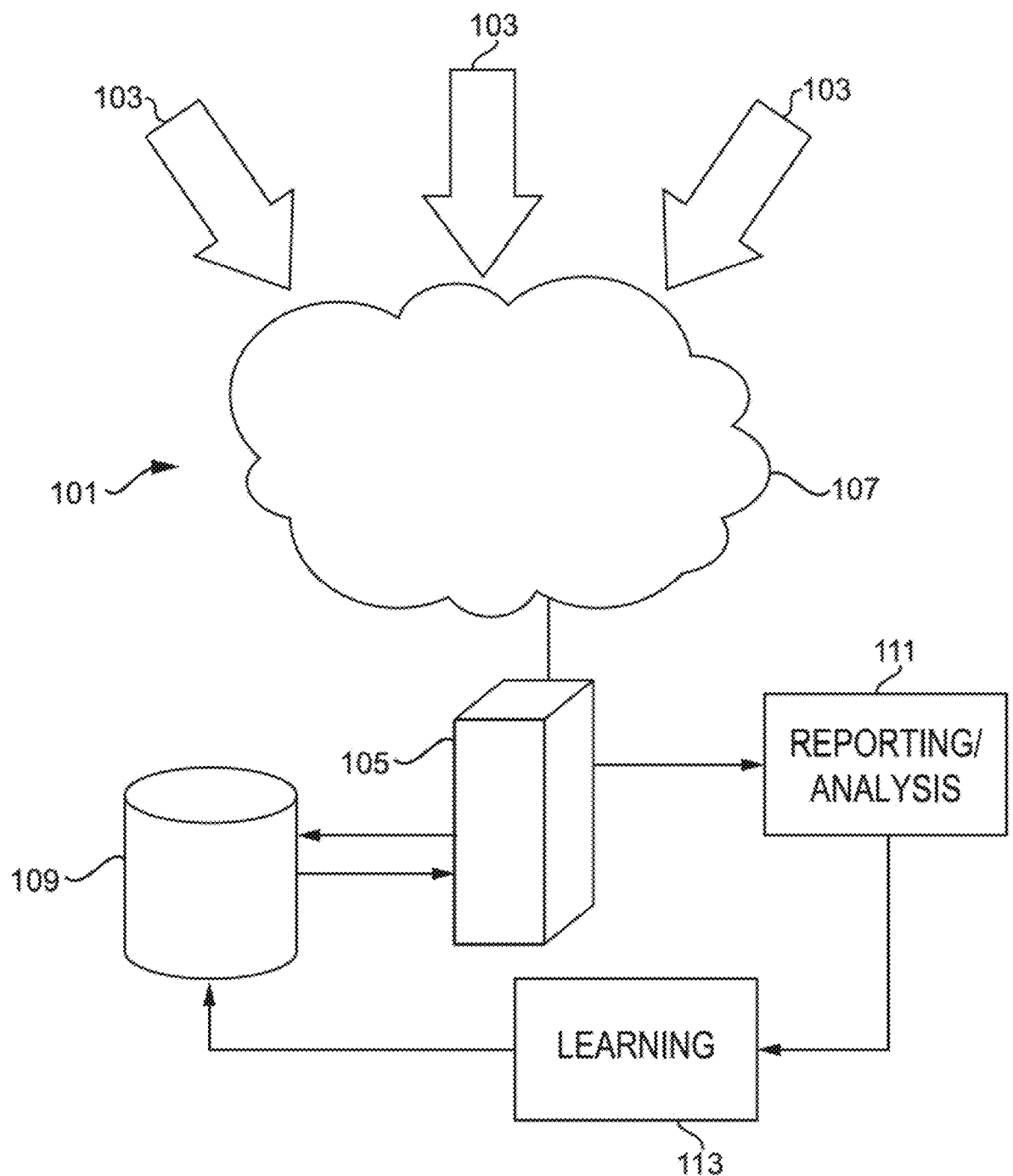
FIG. 2 depicts a logical diagram of a prior art big data system.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Throughout this disclosure, the term "computer" describes hardware, which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, cell phones, mobile phones, smart phones, tablet computers, server farms, hardware appliances, minicomputers, mainframe computers, video game consoles, handheld video game products, and wearable computing devices including but not limited to eyewear, wrist wear, pendants, fabrics, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices, which are not conventionally thought of as "computers", nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

As will be appreciated by one skilled in the art, some aspects of the present disclosure may be embodied as a system, method or process, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable media having computer readable program code embodied thereon.

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Program code embodied on a computer readable medium may be transmitted using any appropriate medium, including but not limited to wireless, wireline, optical fiber cable, RF, etc., or any suitable combination of the foregoing.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

Throughout this disclosure, the term "cloud" and "cloud computing" and similar terms refer to the practice of using a network of remote servers hosted and accessed over the Internet to store, manage, and process data, rather than local servers or personal computers.

Throughout this disclosure, the terms "web," "web site," "web server," "web client," and "web browser" refer generally to computers programmed to communicate over a network using the HyperText Transfer Protocol ("HTTP"), and/or similar and/or related protocols including but not limited to HTTP Secure ("HTTPS") and Secure Hypertext Transfer Protocol ("SHTP"). A "web server" is a computer receiving and responding to HTTP requests, and a "web client" is a computer having a user agent sending and receiving responses to HTTP requests. The user agent is generally web browser software.

Throughout this disclosure, the term "real time" refers to software operating within operational deadlines for a given event to commence or complete, or for a given module, software, or system to respond, and generally invokes that the response or performance time is, in ordinary user perception and considered the technological context, effectively generally cotemporaneous with a reference event. Those of ordinary skill in the art understand that "real time" does not literally mean the system processes input and/or responds instantaneously, but rather that the system processes and/or responds rapidly enough that the processing or response time is within the general human perception of the passage of real time in the operational context of the program. Those of ordinary skill in the art understand that, where the operational context is a graphical user interface, "real time" normally implies a response time of no more than one second of actual time, with milliseconds or microseconds being preferable. However, those of ordinary skill in the art also understand that, under other operational contexts, a system operating in "real time" may exhibit delays longer than one second, particularly where network operations are involved. The term "real-time" necessarily must be understood within the physical and architectural limitations of the existing communication frameworks which must be relied upon to implement the systems and methods described herein. For example, a person of ordinary skill in the art will understand that sharing information and data to participating recipients in a session in real-time with an operational response implicitly means that the data and communications are generated, and shared, as rapidly as the physical and architectural limitations of the system permit, but without the additional delay inherent in a human observer manually performing similar tasks.

Throughout this disclosure, the term "GUI" generally refers to a graphical user interface for a computing device. The design, arrangement, components, and functions of a graphical user interface will necessarily vary from device to device depending on, among other things, screen resolution, processing power, operating system, device function or purpose, and evolving standards and tools for user interface design. One of ordinary skill in the art will understand that graphical user interfaces generally include a number of widgets, or graphical control elements, which are generally graphical components displayed or presented to the user and which are manipulatable by the user through an input device to provide user input, and which may also display or present to the user information, data, or output. Outputs may be text, graphs, or other data.

Throughout this disclosure, the term "endpoint device" refers to a network-enabled computer device communicating with a server system providing services over a telecommunication or other infrastructure network. An endpoint device typically includes a computer or microprocessor processor, and is usually mobile and not fixedly associated with a location. Endpoint devices are usually carried by a user, and usually are in continuous or frequent real-time communication over a network. By way of example, an endpoint device may be, without limitation, a smart phone, tablet PC, e-reader, satellite navigation system ("SatNav"), fitness device (e.g., a Fitbit™ or Jawbone™) Internet-of-things ("IOT") device or any other type of computer whether of general or specific purpose functionality. Traditional fixed location devices may also be endpoint devices, as described herein.

Described herein, among other things, are systems and methods for implementing a situation- or industry-agnostic situation awareness decision support platform in a "little data" architecture. The systems and methods described herein provide a uniform suite of common data services in conjunction with user-defined roles and types to implement a universal, situation-agnostic platform suitable to implement context-specific situational awareness client applications. Such applications cover a limitless variety of industries and situations, some of which are described herein for non-limiting, illustrative purposes. It is important to understand that the backend or server aspects of the system described herein is implemented via a uniform interface applicable to any application from military operations to delivering snacks to a guest at a stadium. The systems and methods described herein also address "data blindness" problems where, particularly in edge situations, a given operator or actor in the system has access only to partial information relevant to his or her immediate context and cannot see the overall big picture of the system state, yet needs immediate decision support without being overwhelmed by massive quantities of data, much of which is potentially irrelevant to the individual's immediate context. The systems and methods described herein enable a uniform "view" into the system state to ensure all actors in a given team have the same understanding of the situation and context, sometimes referred to as a common operational picture.

Figure 3:
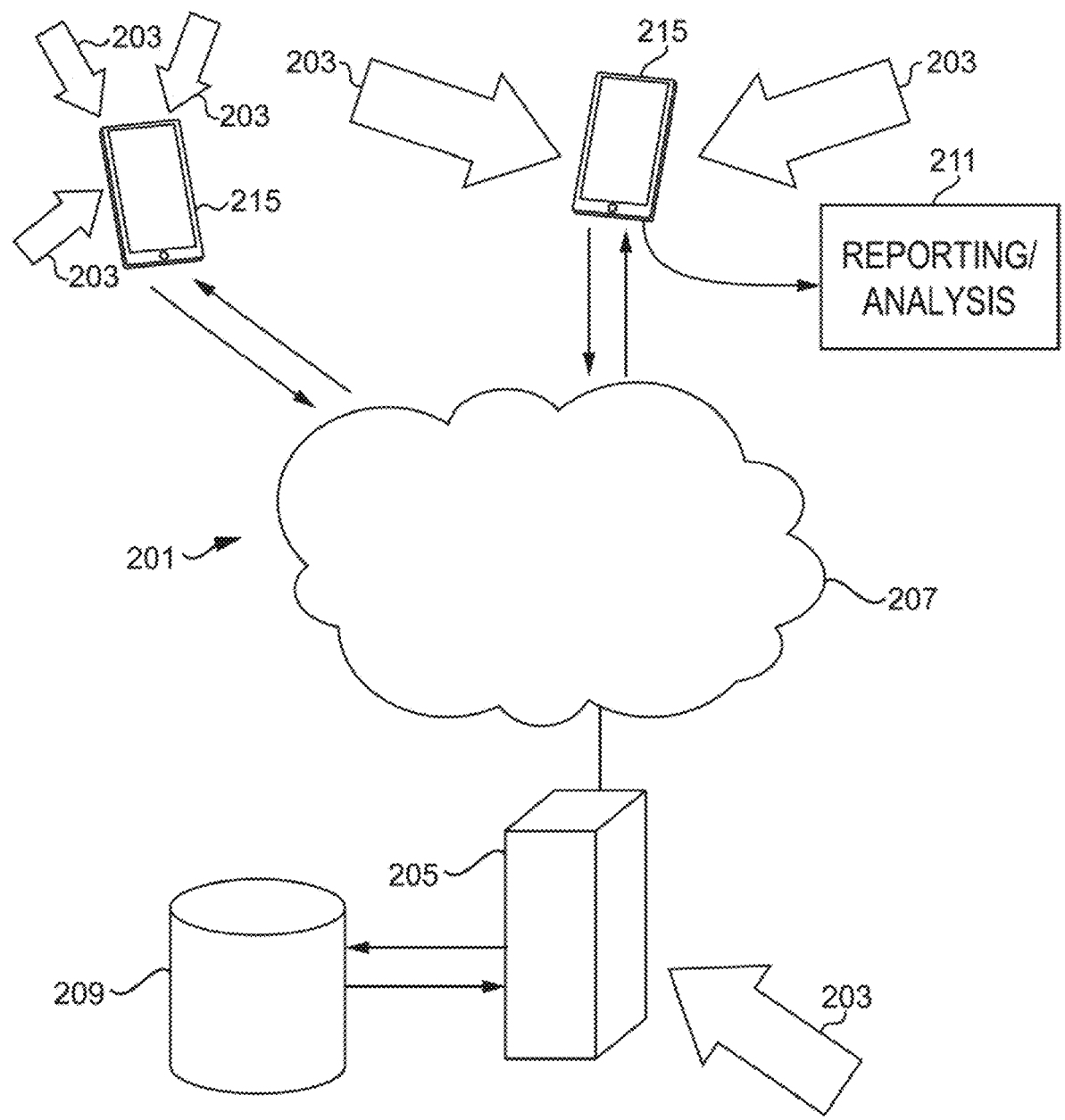
FIG. 3 depicts a logical diagram of a situational awareness computing platform according to the present disclosure.

FIG. 3 depicts, at a high level of abstraction, an embodiment of the systems and methods described herein, sometimes referred to as "little data." Whereas big data solutions search massive quantities of data in search of pattern recognition, little data systems understand that most gathered data is irrelevant or immaterial to the current situation or context. Rather than search for intelligence in statistical patterns derived from massive datasets, little data systems pinpoint the relatively small number of discrete and highly relevant data points for a given context or situation. Unlike a traditional big data implementation, this is done by using the processing power of an endpoint device 215 to implement industry- or situation-specific workflow logic and data connections, and to communicate some or all data to a central computer server 205 having a generally uniform situational awareness platform implemented thereon, generally over a telecommunications network 207.

Some or all received data may be stored in an associated database 209. The computer server 205 generally is programmed with a server in the nature of a uniform situational awareness support software service, which provides common services to all connected endpoint devices 215 based on configuration established by users, the data received, and the functions requested. This facilitates a uniform situational awareness server platform adaptable for use across a variety of industries and situations, with application- or industry-specific programming primarily implemented on the endpoint device 215. Some commonly used data sources and/or services may also or alternatively be provided as generic services via the server, such as mapping, routing, weather, traffic, and so forth.

The depicted central server 205 generally is programmed to provide three primary functions. First, the server 205 is programmed to receive and track the locations of endpoint devices 215, usually associated with a session. These locations are generally provided to the server 205 by the endpoint devices 215 via the telecommunication network 207. The endpoint devices 215 typically determine their own location using location detection technologies implemented at the endpoint devices 215. For example, a Global Positioning System (GPS) receiver in a mobile phone 215 may periodically provide the phone's location data to the server 205 over the telecommunications network 207. In some embodiments, one or more endpoint devices 215 may have a fixed location, such as a security or traffic camera. These locations may be established at the server 205 via configuration data. The server 205 may maintain an historical record of locations of each device 215 as received by the server 205.

These devices 215 generally will transmit at regular intervals the location of the device, along with a timestamp. The location data, along with a unique identifier for each device 215 (e.g., a user ID), and the timestamp when the location data was captured, are stored in the database 209. This provides the server 205 with a record of the most recent location data for each device 215, and the time of that location data. Additionally, or alternatively, the server 205 may store a timestamp of when the server 205 received the location data, allowing the server 205 to identify gaps that may indicate poor connectivity or malfunction of an endpoint device 215. For example, if the server 205 receives an updated location timestamped more than an hour ago, this information may be used to determine whether notifications or messages should be sent to that device 215 as described elsewhere herein, or used to alert a supervisor of a potential problem. The location data transmitted by the endpoint devices 215 may be retransmitted to one or more other endpoint devices 215 connected via the same session.

Second, the server generally is programmed to implement messaging and notification services, whereby information, messages, and/or alerts are sent by the server 205 to one or more endpoint devices 215 over the telecommunications network 207, typically based on context-specific data, such as in response to events or variable changes that alter the projected status of the actors in the system. By way of a simple example, if a particular endpoint device 215 connected to the server 205 suddenly discontinues communication with the server 205 for at least a threshold period of time, the server 205 may send a notification to one or more other endpoint devices 215 connected to the server 205 that the non-responsive device 215 is offline. Typically, the particular endpoint devices 215 to which a given message or alert is to be sent by the server 205 is determined based on a comparison of a relevant geographic region associated with the message to the most current location data for each endpoint device 215. If a given endpoint device 215 is determined to be within the associated geographic region for the alert, the message is sent to that endpoint device 215.

Additionally, or alternatively, messaging may be sent to an endpoint device 215 based upon other context data, such as whether the assigned user of that endpoint device 215 has a status, role, mode, or other characteristic data that matches a context characteristic associated with the message. For example, if the message is relevant to only users having a specific role in the organization, then the role of the user assigned to each endpoint device 215 is compared to the role associated of the message, and the message is sent only to those endpoint devices 215 assigned to users having the matching role. As described in more detail elsewhere herein, the data for the various roles, status, or modes in the system is provided as configuration data for a particular application 217, storage model and/or defined by the implementer of the client application 217 (described elsewhere). The configuration data is usually data stored at the server 205. The server 205 itself is generally data-agnostic, as described elsewhere herein.

Third, the server 205 supports custom workflows via a uniform, content-agnostic data exchange protocol. As described in the background section, each specific industry or situation develops situational awareness based on the operational experience, knowledge, and best practices developed by experts in that field. The workflows appropriate to any one situation are difficult to support in a single server platform. The depicted server 205 facilitates custom workflow by shifting the industry-specific workflow logic to a client application 217 running on one or more endpoint devices 215. These applications 217 are specific to the industry and conform to the workflow of that industry. The applications 217 may be existing applications modified to use the server 205 or newly built. This is an improvement over the prior art, in which users were expected to change workflow to conform to the preprogrammed capabilities of a server.

The client side application 217 also is often the simplest place to implement situation-specific data monitoring, such as access to third-party systems that are particular to a given context or industry. By way of example and not limitation, a car rental company may integrate inventory tracking systems, personnel management systems, and reservation and ticketing systems at the client application 217, as these systems and their associated workflows are likely particular to the specific car rental company and unlikely to be used in exactly the same manner by any other user. However, commonly used data sources that are shared across industries may be implemented at the client 217, but may also, or alternatively, be made available via the server 205. Without limitation, examples of such data sources include: weather services; mapping, routing, and traffic services; and law enforcement and emergency notification services.

Implementing situation-specific data monitoring at the client application 217 allows each industry or enterprise to integrate the situational awareness platform of the server 205 with existing workflow, third-party applications, and data sources without having to alter the way tasks are completed. By implementing commonly used third-party data sources at the server 205, development time and data duplication is reduced. This may be done on a session-by-session basis, or globally.

By bringing all of these disparate systems to bear in a client application 217, a "system of systems" is provided which facilitates the harmonization and synchronization of multiple systems in use by a company, which do not necessarily bear any relationship to each other. Returning to the car rental agency example, a car rental company generally has an inventory database tracking the vehicles that are in the rental fleet and their respective operational statuses. Additionally, the agency generally has a database of reservations or requests for vehicles. Although these two systems may appear to be similar, they in fact bear no relationship to each other. That is, whether the agency currently happens to have any given make or model of vehicle in operational condition in a given location is immaterial to whether a rental customer currently desires the use of such a vehicle.

Thus, fleet management software is generally focused on data about the condition of vehicles in the fleet, whereas a reservation system is generally focused on data about customers and times. Neither system has any particular need for data in the other. For example, a fleet database might be used for a car dealership or delivery service, both of which maintain vehicle fleets that are not rented out. Conversely, a reservation system is applicable to industries that do not involve vehicles at all, such as restaurant tables and event ticketing.

By developing a client application 217 that incorporates both fleet management and reservation systems, and incorporating common data services available via the server, the company can provide a "system of systems" that offers to all users a common operational picture of both systems while also integrating with other third-party data, such as weather and map information. The systems and methods described herein are thus also different from point solutions, which are highly specialized solutions to a given discrete problem. Instead, the systems and methods described herein use point solutions as inputs or data sources, and can leverage the problem-specific logic implemented via point solutions into a single platform for a given actor or system: again, a "system of systems."

The core functions of the server 205 provide new context to existing data and legacy systems, connect operators and actors within the system more efficiently, and enhance operational workflow and efficiency by providing real-time data via a data-agnostic platform. To illustrate how the systems and methods described herein operate, a description of the basic data exchanged within the system is provided, along with specific examples.

First, an organization or industry seeking to utilize the power of the platform described herein implements a client software application 217 for use on certain endpoint devices 215 connected to the server 205. This application 217 may be an existing application 217 already used by the enterprise and is adapted to use the server 205 as described herein, or an entirely new application 217 custom built to use the server 205 described herein. This application contains industry, situation, or enterprise specific workflow logic and programming in accordance with the operational needs of the particular enterprise. In most cases, this implementation process includes defining the major situational awareness variables described in this disclosure, such as the actors, roles, events, data sources, to be tracked. Some or all of this data is stored at the server 205, usually in the database 209, in a format understandable by the server 205.

By way of simple example, if the enterprise is a first responder, the roles may include "dispatcher", "firefighter", "police", "EMS", and the like. This configuration data may be stored in any appropriate format. For example, the string descriptors may be uploaded to the server and associated with a unique identifier for each role. When a new user is added to the system, each user is then associated in the configuration data with one or more of these roles.

Similarly, as described elsewhere herein, events and messages may likewise be associated with one or more roles. For example, a given message may be relevant only to dispatchers, and thus the server will send "dispatch" messages only to endpoint devices 215 associated with users having the role of "dispatcher." The particular composition and complexity of the configuration data for any given implementation will of course depend upon the particular needs of the specific application. Examples of the type of application-specific data that may be relevant in an embodiment include: users; equipment; inventory; routes; locations; destinations; events; and so forth.

Referring to FIG. 3, in a typical use of the systems and methods, each user is associated with an endpoint device 215 having the appropriate client application 217 thereon. The user arrives at work in possession of the endpoint device 215 and operates the device to start the client application 217 for job function. The application 217 authenticates a session with the server 205 via the telecommunication network 207. Authentication techniques are well known in the art and need not be further explained in detail herein.

The server then adds the authenticated endpoint device 215 to a session. A session, as used herein, is essentially a collection of client-server connections between the server 205 and one or more endpoint devices 215, wherein all of the endpoint devices 215 in the session are used for a common operational or business purpose. For example, in the depicted embodiment of FIG. 4, five endpoint devices 215 are being used. There may be other, separate sessions using the same server 205 via a different collection of endpoint devices (not depicted). Thus, the depicted endpoint devices 215 are all part of a shared session, generally identified via a session key or other identifier as would be understood to one of ordinary skill in the art, and the other (not depicted) endpoint devices are part of a separate session also identified by a separate unique key or identifier. When a device communicates with the server 205, it may transmit the associated session key, allowing the server 205 to identify other related devices in the same session. The session concept allows related devices to share communications and information with each other, while not sharing those same communications and information with devices in other sessions. This allows a single server implementation to support a multitude of unrelated situational awareness clients, without risk of sensitive data being inadvertently shared outside of the collection of endpoint devices 215 associated with each individual enterprise. Additionally, this reduces or eliminates the distribution and/or sharing of data to a multitude of users which may not necessarily be relevant to each.

The server 205 may receive, create, or assign a unique identifier to the particular endpoint device 215 associated with the user. The application 217 on the endpoint device 215 may transmit a unique user identifier, such as a user name, to the server 205, so that the server 205 has data usable to identify the specific user of the endpoint device 215 and can access configuration data about that user, such as name, role, status, and so forth, which is then used to determine which notifications should be sent to that endpoint device 215.

Typically, the server 205 is provided or configured with tasks that may be assigned, or assignable. For example, tasks may be assigned either to a specific user or to any user having the role associated with the task. Tasks may be configured at the server 205 by an administrator or supervisor user, usually by use of a separate endpoint device 215 of such administrator or supervisor. When the user connects via the endpoint device 215, the endpoint device 215 requests the tasks for the user, which tasks are transmitted by the server 205. By way of example, if the user is assigned the role of "driver" in a delivery service, the tasks received may be a set of pickups, deliveries, or routes. However, if the user's role in the same enterprise is "mechanic," the tasks may be a set of vehicles requiring service. The application software 217 on the endpoint device 215 transmits the location of the endpoint device 215 on a periodic, and generally regular, interval to the server 205 as described elsewhere herein as the user goes about completing the assigned tasks. This process is repeated for other actors in the system.

The server 205 and/or the endpoint device 215 also may receive data, including without limitation, from data sources 203 relevant to the endpoint device 215. In an embodiment, the endpoint device 215 is the primary point for receiving such data, because the endpoint device 215 is programmed with application software 217 appropriate to the industry. The application 217 on the endpoint device 215B is programmed to connect to such external data source and receive the data 203B. The received data 203B may, in an embodiment, be repackaged and sent to the server 205 in accordance with a standard format defined by the server's communication protocols or may be transmitted in the native format in which it is received. The reformatting and repackaging is performed by the application software 217 on the endpoint device 215B. As will be clear to a person of ordinary skill in the art, these data sources may include "big data" sources. That is, the present systems and methods are not big data solutions to a problem, but may use big data sources as an observable 110 input or data source. In an embodiment, the server 205 may also, or alternatively, receive data directly from one or more data sources 203E, or directly from external monitors 215A and/or sensors 215A.

The endpoint device 215 begins to send location data updates as described herein. The user completes tasks as assigned and marks the tasks as completed in the application software 217 on the endpoint device 215, and the endpoint device 215 communicates with the server 205 to indicate that the tasks have been completed. When the user has finished all tasks for the day, he may close the application 217 or otherwise send an indication that all tasks are done.

Referring again to the OODA loop, tasks and other system outputs may also be used as inputs to the next cycle in the loop. Data such as whether a given task has been completed, or how far along the assigned resource is towards completing the task, become observable data points for further orientation 110 and decision-making.

In the event that there is a change in the system state (e.g., session), the system can be used to provide real-time situational awareness decision support. In a typical case, one or more endpoint devices 215 communicating with the server 205 may receive data from a data source 203 indicative of an event or variable change, usually associated with a geographic region, which may affect other users in the session. When this happens, the relevant endpoint device 215 may transmit to the server 205 data concerning the detected event or variable change. This data may include an identifier of the nature of the event or variable change, and may also, or alternatively, include additional data pertaining to the event.

The server 205, upon receiving such a notification from an endpoint device 215, may then send a notification or alert to other potentially impacted endpoint devices 215. In a typical case, because the location of connected endpoint devices 215 is known by the server 205, the server 205 can determine which endpoint devices 215 are within the associated geographic region of the event or variable change, and can transmit to such endpoint devices 215 a notification or alert concerning the detected event or variable change. Endpoint devices 215 receiving this alert may then display the alert. This same process can be carried out using data received directly by the server 205 from a data source 203. For example, the server 205 may be programmed to continually monitor weather for dangerous events and notify all connected devices 215 (in any session) of any weather event impacting the geographic region in which the endpoint device 215 or other relevant asset is located (according to the most recently received location data).

Additionally, users having supervisory or administrative roles may send specific messages to specific endpoint devices 215, the receiving devices being determined by the server 205 based on whether the device 215 or user associated with the endpoint device 215 match the criteria relevant to the message. The server 205 may determine which endpoint devices 215 should be notified or given an alert or message based on configuration data associated with the users of each endpoint device 215. For example, a common factor in situational awareness is the mode or role of a given user. Depending upon the mode or role of the user, certain messages may or may not be relevant to that user. As described herein, user data is typically established in the server 205 memory or database 209, and associated with a role or mode. This role or mode is essentially the unique identifier defined by configuration data provided by the administrator or supervisors of the application software 217 on the endpoint devices 215.

The server 205 generally is agnostic as to the nature of this role or mode data, and it may be as simple as a unique identifier (e.g., 3 equals "delivery driver"). Thus, when an alert is sent, the server 205 uses the configuration data indicating what types of alerts correspond to which types of roles to then determine which endpoint devices 215 are associated with users who should receive a given message. For example, the server 205 may be programmed with configuration data providing that alert type "C" goes to users with role "3". In this example, notification type "C" may be a weather emergency, which is relevant to all delivery drivers (assigned role "3"). However, users with a different role (e.g., "5" referring to "mechanics") may be indoors in a repair facility and thus not affected by events of type "C" (weather). In this way, the server 205 remains data-agnostic, and the specific knowledge of the meaning of these roles and alerts and the relevant workflow is implemented primarily via the application software 217.

Figure 4:
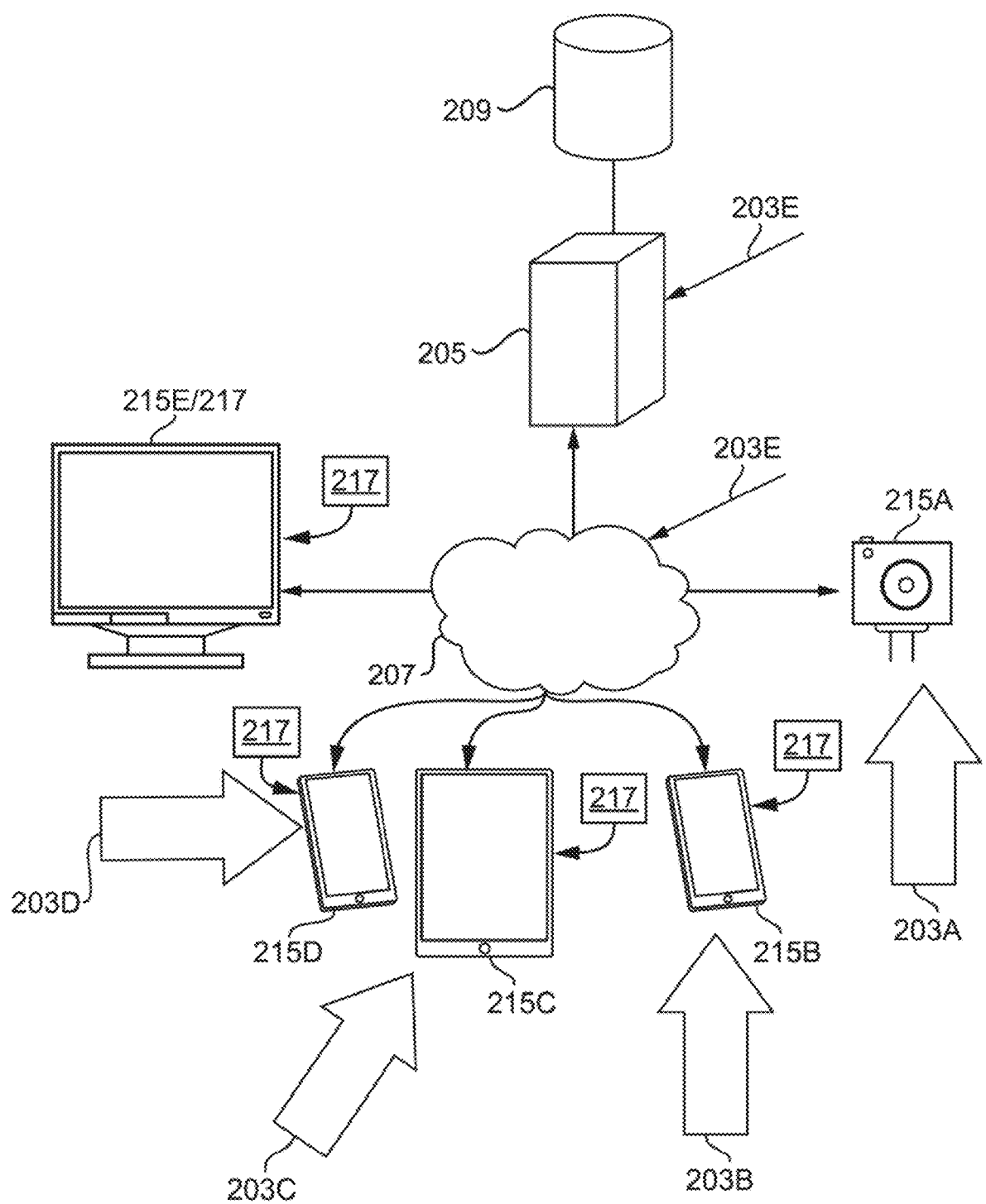
FIG. 4 depicts a more detailed logical diagram of a situational awareness computing platform according to the present disclosure.

Referring now to FIG. 4, a more detailed schematic view of an implementation of the systems and methods described herein is depicted. In the depicted embodiment of FIG. 4, a situational awareness server 205 is operatively connected to a database 209 and communicates via a telecommunications network 207 with a plurality of endpoint devices 215A, 215B, 215C, 215D, 215E (referred to herein collectively as endpoint devices 215). In the depicted embodiment of FIG. 4, a first endpoint device 215A is a sensor.

The depicted sensor 215A is an optical sensor, such as a digital camera communicatively connected to the server 205 via the telecommunications network 207. The sensor 215A is effectively one data input 203 to the server 205. A second depicted endpoint device 215B is a mobile phone of a user. A third depicted endpoint device 215C is a tablet computer of another user. A fourth depicted endpoint device 215D is another mobile phone of a user. Finally, a fifth depicted endpoint device 215E/217 is a desktop computer.

Each of the depicted endpoint devices 215 communicates via the telecommunications network 207 with the server 205. Again, the nature of the communications and data provided by each endpoint device 215 depends upon each endpoint device's 215 role in the system. For example, sensors, such as depicted device 215A, provide data in a format and nature particular to the detection capabilities of the sensor. Because depicted sensor 215A is an optical sensor, image data would be transmitted, potentially with other data, such as resolution, timestamp, orientation, and any other information that the sensor 215A is designed to detect and transmit.

In any given implementation, one or more sensors 215A may be used to provide inputs, either or both to a client application 217 on an endpoint device, or directly to the server. The number and type of sensors will naturally vary from embodiment to embodiment depending on the particular needs of any given implementation. In some cases, a single sensor or handful of sensors may be used, whereas in others the system may use thousands or millions of individual sensors. Generally, sensor inputs are provided to the server 205, either indirectly via a client application or endpoint device, or directly. A function of the server 205 in such an embodiment is to filter a large amount of sensor data, generally received in real-time, to disregard data that is not indicative of an event or other context requiring action or consideration.

By way of simple example, consider an embodiment in which one input to the system is a temperature sensor in a storage structure, such as a warehouse or grain silo. The acceptable temperature readings are known to the industry, and the vast majority of the temperature readings in the structure will be within a normal and acceptable range. Because such readings are indicative of a non-actionable context, they are generally disregarded (operationally, they may be logged or recorded for posterity) and not reported via the system. This filtering function eliminates unnecessary information, as stakeholders in the system will assume normal temperature readings absent an affirmative indication otherwise. By contrast, when a sensor reading, such as temperature in this example, is above or outside acceptable parameters, the filtering function of the server 205 may trigger an alert, message, or notification. Based on context-specific rules defined by the user, the recipients of this information will depend on user-configured data. For a temperature anomaly, for example, it may be appropriate to notify only those users whose role matches the context of the alert (excessive temperature), such as firefighters, and who are located closest to the alert (as determined via mapping data at the server 205) or can reach the location of the alert the most rapidly (as determined via routing services at the server 205). Similarly, the filtering function may determine not to alert other users, even if nearby, whose defined role does not match the emergency. For example, a user assigned the role of grain truck driver cannot assist with a fire emergency and would not only not be routed to the fire, but might instead be routed away from it for safety.

By way of another non-limiting example, sensors may be dozens or hundreds of optical cameras in a public or semi-public venue, such as an airport or sports stadium, with connected facial recognition software. These cameras may conduct facial recognition of passersby and attempt to match individuals to a database of wanted criminals, terrorists, or other wanted persons. When a match is found, the present systems and messages may be used to route a message to relevant personnel, which could include the image in which the person is recognized, which may also be modified to emphasize the recognized individual. For example, if the matched individual is indicated as being potentially armed and dangerous, unarmed venue security personnel may not be alerted, but instead the nearest armed law enforcement officer may be notified of the presence of the individual and the specific location. Again, by providing context-specific data effectively in real-time, the CODA loop is tightened and there is a greater chance that the system achieves its operational goals. The alerted officer, having received a notification in real-time of a wanted individual physically proximate to the officer's location and an image of the identified person, is more likely to be able to confirm visually the presence of the detected offender and to track the person down for arrest. This again aggregates data from disparate and otherwise unrelated resources into a common operational picture, and filters the data relevant most relevant to each user's role, location, and present status. These are just some examples of the types of sensors that may be used, and any type of sensor is appropriate for use as described herein, including the Internet-of-things and other inputs.

Generally speaking, events are driven by inputs to the system at the observation 110 level. These inputs may come from sensors, as in these examples, or from other data sources, such as information supplied to the server 205 via the client application 217, or information supplied directly to the server via third-party data sources or services like weather and traffic services, as described elsewhere herein. The system response to events depends on the context logic as programmed via the client application 217 and established in user-supplied rules and context definitions. Responses may be autonomous or require manual input based on a human decision.

As described elsewhere herein, the depicted endpoint devices 215B, 215C, and 215D are ordinarily carried by users needing situational awareness decision support, who are often in the field remote from a centralized location, where there may be intermittent or unreliable network connectivity. The devices 215B, 215C, and 215D contain that client application software 217 implementing the situation-specific or industry-specific workflow to provide the appropriate situational awareness.

The endpoint devices 215, via the application software 217, may also have or receive data 203 from other sources. In the case of a sensor, such as the depicted camera 215A, the data 203A received by the device 215A is light or other electromagnetic radiation. Alternatively, in the case of a user device such as the mobile phones 215B and 215D, data 203B and 203D may be received from third-party sources in accordance with the operational needs of the application 217.

For example, if the industry in question is a delivery service, endpoint device 215B may receive data 203B from a traffic monitoring service. This could be a built-in traffic monitoring service native to the operating system of the endpoint device 215B, or a third-party source. The delivery driver application 217 may include a traffic or mapping system 203, and receive real-time weather 203 and traffic 203 data. In an alternative embodiment, this data may be provided to the server 205 and transmitted via notifications as described elsewhere herein. As the endpoint device 215 receives this data 203, the endpoint device 215 may reformat and/or repackage the data 203 into a standard structure for transmission to and storage at the server 205. Alternatively, the relevant data 203 may be sent in a native format to, and stored at, the server 205. This allows the server 205 to redistribute data in native format to other endpoint devices 215 that have application software 217 capable of understanding that data.

The data 203B may be weather data, traffic data, or vehicular telematics data received from the delivery vehicle (e.g., via the vehicle's data port or via wireless communications such as Bluetooth™). One or more of these data input streams 203 to the application 217 may be packaged, together or separately, for transmission to the server 205 as described elsewhere herein. This same basic functionality applies to all endpoint devices 215 and the data inputs 203A, 203C, 203D received by each.

Not all endpoint devices 215 necessarily have the same functionality available in the application software 217, and, depending upon the assigned role of the person carrying the device 215 (as reflected in configuration data), the features available may differ from endpoint device 215 to endpoint device 215. For example, in the depicted embodiment of FIG. 4, endpoint device 215C could be a tablet PC of a manager or supervisor responsible for overseeing the delivery activities of the users holding devices 215B and 215D, each of whom are in separate delivery trucks.

The server 205 may be programmed with any number of additional functions. For example, the server 205 may retransmit to all endpoint devices 215 of a session the updated location data for each other endpoint device 215 in that session. This allows each endpoint device 215 to be aware of the (relatively) real-time location of the other endpoint devices 215 of the same session. Alternatively, the updated location information may be transmitted only to a subset of the endpoint devices 215. For example, in the case of a delivery service, it may be that only the supervisor using the tablet endpoint device 215C needs up-to-date location information. In such an embodiment, the current locations of endpoint devices 215B and 215D may be transmitted to the server 205 and then retransmitted by the server 205 to the tablet 215C. The decision of the server 205 to do this would be based upon configuration data, as described elsewhere herein. The session identifier for each user may identify the role of the user of the endpoint device 215, allowing the server 205 to know which endpoint device 215 should receive specific information.

In the depicted embodiment of FIG. 4, users of endpoint devices 215B and 215D may have associated user data as described elsewhere herein. Thus, those endpoint devices 215 transmit an identifier or token to the server 205 identifying the endpoint device 215 and the associated mode, status, or role of the user of the device 215. This identifier may be an integer or other unique identifier known in the art. Endpoint device 2150, however, is configured for administrator or supervisor mode, and thus transmits a token identifying the endpoint device 215 and the role of the user as a supervisor. Based on configuration options, the server 205 knows that location data received from any endpoint device 215 in this session assigned to a "driver" user should be transmitted to endpoint device 215C (or any other endpoint device 215 assigned to a supervisor), but not to devices 215 assigned to other drivers, such as endpoint device 215B and 215D.

Other information may likewise be distributed according to this logic. For example, when the driver for endpoint device 215B arrives at work, the driver may connect to the server 205 via the application, and request the day's work orders. Those work orders will have been entered or set up by a supervisor, such as a supervisor using endpoint device 215C or, alternatively, a supervisor using an administrative workstation such as endpoint device 215E. Those work orders may be sent to and stored by the server 205, awaiting the arrival of the drivers for the day. When the driver for endpoint device 215B arrives, and the driver's user ID and session are transmitted to the server 205, the endpoint device 215B can request the work orders, if any, assigned to that driver, based on matching the driver's ID. Alternatively, other logic may be used. For example, the endpoint device 215 may simply transmit that the role of the endpoint device's 215 user, and request the next available work order appropriate for a user with that role. Again, the server 205 is programmed to respond to these requests but is agnostic as to the particular nature or operational significance of the roles. The server 205 simply receives an identifier from the endpoint device 215, i.e., an instruction, and responds.

The data-agnostic nature of the server 205 may be better understood through further examples. Referring again to FIG. 4, an entirely different situational awareness scenario can be envisioned. For example, consider a circumstance in which the depicted system is used by a utility company to manage meter readings in the field, such as in a remote environment involving widely dispersed residences or facilities. In such an embodiment, each meter reader has an endpoint device 215B or 215D, and, upon connecting to the system, receives from the server 205 an assignment of addresses or other locations that the meter reader is to visit for the day. The reader would then proceed in the reader's vehicle to the first such location. As described above, the endpoint device 215B relays at periodic intervals the detected location of the endpoint device 215. This location may be accessed by a supervisor using tablet 215C to ensure that all readers are en route to the correct locations. Upon reaching the first location, the reader carrying endpoint device 215B marks the location as having been serviced, and then proceeds to the next location on his or her route. This process continues throughout the day.

However, in this illustrative embodiment, the supervisor using tablet 215C receives data 203C from a weather service indicating that a dangerous storm is approaching. This data may indicate the location, size, shape, and direction of the storm, or the supervisor may draw the approximate shape or location of the storm on a map in the application on endpoint device 215C. This data can then be relayed to the server 205 as an alert or notification. The geographic area defined by the alert is then compared by the server 205 to the current locations of the endpoint devices 215B and 215D in the session, and any endpoint devices 215 located within the designated geographic area then receive an alert notifying the holder of the endpoint device 215 of the storm and its location. The endpoint devices 215 may then display the storm, or may directly connect to the same data source 203C to view the most current information about it. Again, the server 205 need only know that, when it receives a certain type of data with an alert status, the server 205 transmits an alert code or message typed in by the user of the tablet 215C to all connected endpoint devices 215 in the session located within the geographic area defined by the alert message. For example, the supervisor using endpoint device 215C may associate with the alert message the text "storm approaching, seek shelter immediately" and the server 205 will relay that message to the impacted endpoint devices 215.

The same basic functionality can be used to implement multi-role users, which is particularly helpful where the nature of an emergency may demand a different type of responder. For example, the same system depicted in FIG. 4 may be used by a dispatcher to alert relevant personnel within a geographic region of a type of emergency. By way of example, a dispatcher using tablet 215C may receive an emergency call indicating that a vehicle is on fire on a highway. The dispatcher may then send an alert to the server 205 with the address of the emergency and an indicator that the nature of the emergency is "fire." The server is preconfigured with data indicating that endpoint devices 215B for users with the role "firefighter" should be given an alert directing them to the location. Thus, when the server 205 receives a location and an alert request of type "fire", the server 205 identifies all endpoint devices 215 assigned the role "firefighter" and located within the geographic region of the location of the emergency, and sends a notification to those endpoint devices 215 that there is a fire emergency, and transmits the location of the fire to those endpoint devices 215.

This has the advantage of not sending irrelevant alerts to all devices in the session, which minimizes traffic and emphasizes the importance of messages that are received. The way of making and using the system will be clear to one of ordinary skill in the art. The server 205 has or offers a number of application programming interfaces (API) and/or software development kits (SDK) which can be accessed and used from a mobile device application 217 to send and receive data to the server 205. To prevent unauthorized access, all applications 217 may be required to authenticate sessions or connections via a license key or other code. An advantage of this architecture is that each endpoint device 215, although part of a session of related endpoint devices 215, contains a streamlined, uncluttered view of relevant activity to the user. This enables the user to quickly view and assess only situational awareness data that directly pertains to that user's situation, reducing the amount of unnecessary and superfluous information provided to any given decision maker in the session. Likewise, this allows managers and administrators to monitor more easily the status of multiple users simultaneously, helping to ensure that tasks are completed and goals are met.

The server 205 may implement, in cooperation with the client software 217, any number of additional functionalities. For example, the server 205 may be configured to provide automatic task assignment based upon any number of criteria. Tasks may be set up in the system by administrators, and set to assign automatically based on proximity of a user of the appropriate role. For example, in a delivery context, there may be a pickup at a particular location, and upon a user with the role "driver" arriving within a threshold distance of the pickup location, the task to pick up that delivery may be automatically assigned to that driver, who receives notification on his endpoint device 215 of the assigned task and the location. The application 217 may then do anything else that the application is programmed to do, such as automatically route the driver from his or her current course to that pickup location.

In an embodiment, the functions of the server 205 include messaging, location, and workflow management. The server 205 may further functions and/or data elements may include people, users, date/time, any or all of which may be associated with events, assets, and the various elements of the system in a given embodiment. Additionally, the server 205 may be programmed to support basic administrative functions, such as configuration of the server, services, user accounts, roles, security access levels, and other customization of the associated descriptors. For example, from a server 205 perspective, a "firefighter" role need only be an integer in a table associated with a text description of "firefighter." This configuration data is provided by an administrator to support a particular application 217.

Additionally, the applications 217 may be integrated with external systems, technologies, or sensors. In the depicted embodiment, a sensor 215A in the form of an optical camera is attached via the telecommunications network 207 to the server 205. This functions as an additional endpoint device 215, which can be controlled and operated by the server 205.

For example, the same system depicted in FIG. 4 may be used as a security system by an off-campus security company. In such a situation, a security camera 215A may be positioned near a stairwell, and may be one of dozens or hundreds of security cameras that form the monitoring system. When a security guard holding an endpoint device 215B encounters an emergency situation in the stairwell, such as an assault or an injury, the security guard can use the security application 217 to request assistance by identifying the nature of the emergency (e.g., "injury", or "crime"). The server 205, having data concerning the location of all the cameras attached to the system, can then automatically direct the feed from camera 215A to a dispatcher 215C who can then monitor the situation and coordinate a response in real-time, and can notify appropriate first responders.

The external devices 215 may be other devices besides cameras. For example, RFID tags and antennas may be used, as well as other types of sensors, ranging from temperature sensors to smoke detectors to motion detectors, audible sensors, seismic sensors, and so forth.

It is important to understand that the systems and methods described herein are not big data analytics tools. Rather, these systems and methods use big data and analytics tools as inputs (e.g., observations 110 in the OODA loop), filter non-actionable data, and provide a common operational picture, which may include context-relevant elements of analytics or big data inputs to inform decision-making.

The systems and methods provided herein facilitate the creation of a uniform platform for providing a common operational picture based on a plurality of disparate and nominally unrelated data sources. This is done, as described herein, by utilizing real-time data received from multiple sources (e.g., sensor systems, third party data sources, client point solutions, client legacy data and/or systems, etc.), filtering out unnecessary data points, and providing a common, real-time operational picture of relevant data. This may be done through dashboard views, notifications, chat, messaging, and other communication techniques. This data is combined with time and place data, such as the location of users via endpoint devices and the presence and status of things (e.g., IOT data). The systems and method described herein provide the framework to unify these various data sources into a single operational view and then project the future system state forward to assist in context-aware real-time decision support via a server platform which itself is context-agnostic.

The server functions may include some or all of various services, sometimes referred to as "microservices." These include one or more services selected from location, mapping, messaging, and other services described here. Other, non-limiting examples of such services include: identity services (including but not necessarily limited to Active Directory, LDAP, SAMLP, OAuth2, Google Apps, WS-Federation, PingFederate, SSO, and multi-factor authentication); messaging services (including but not necessarily limited to text, audio/video, group chat, mentions, attachments, presence, and SMS); GIS (including but not necessarily limited to geofencing, nearby, routing, geocoding, DVR, tile provider, telestration, and annotation); social (including but not necessarily limited to ratings, achievements, leaderboards, activity feeds, sharing, and wilds); scheduling (including but not necessarily limited to calendars, and event triggers); settings (including but not necessarily limited to calendar, tasking, and event triggers); MDM (including but not limited to HockeyApp, MobiControl, local store, and geo provision); sensors (including but not necessarily limited to general purpose sensors, OBD, and event triggers); and analytics.

The systems and methods described herein are explained with respect to the illustrative example of a conventional client-server operation, but it will readily apparent to a person of ordinary skill in the art that other system architectures for implementing the functions of the server are possible and within the skill of a person of ordinary skill in the art. By way of example and not limitation, the server may be replaced or augmented by a functionally equivalent distributed computing environment, such as a peer-to-peer network or block chain network.

Figure 5:
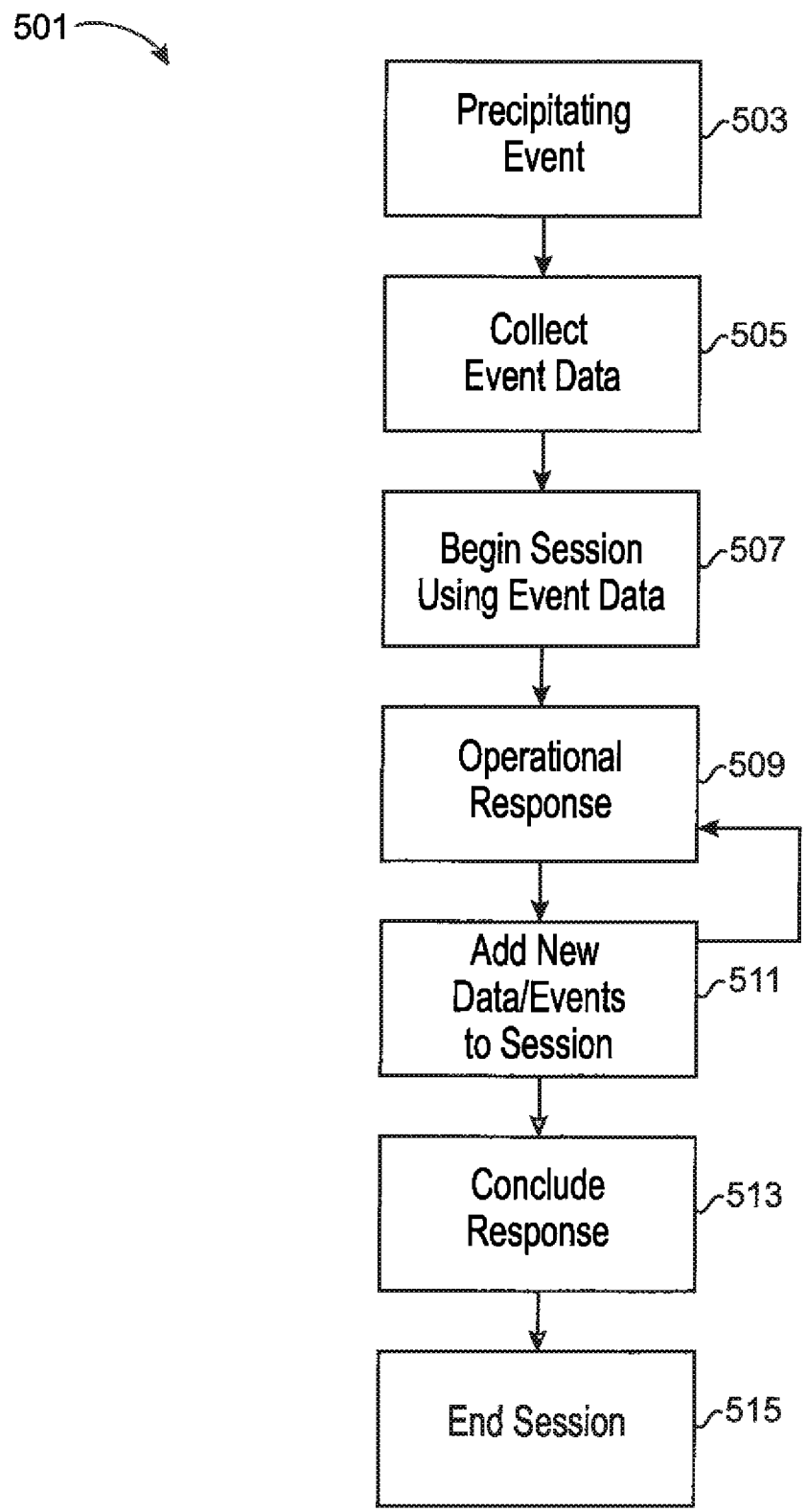
FIG. 5 depicts a flow chart of a session according to the present disclosure.

As shown in FIG. 5, in an embodiment, the concept of a "session" is further is further described. Conceptually, a "session" can be thought of as a programmatically created and managed logical container for data representing a real-world event. For example, activities ranging from delivering goods, an alarm being triggered, or a request for a service all have associated data points that can be monitored, collected, tracked, and structured in real-time as the event takes place. The event eventually completes and thus has a concrete beginning, middle, and end. Sessions are initiated by a specific precipitating event (e.g., a sensor event, a schedule, or a manual trigger), and has an associated work flow which uses context rules to identify the proper recipients and/or originators for tasks, session data, and communications.

As described elsewhere in this disclosure, a "session" can be understood in a basic technical sense as a collection of network connections between a server 205 and one or more endpoint devices 215 communicating through the server 205, which creates and manages the session in real-time with the related operational response. Each of the endpoint devices 215 in the session is used for a common operational or business purpose. A session functions an organizational tool for providing a shared virtual workspace to manage, communicate, and collaborate in real-time, generally in response to a precipitating event 503.

Thus, a session has a defined beginning point 507 and endpoint 513 encapsulating a middle time period of an operational response 509 to the precipitating event 503. As the operational response 509 is conducted, team members associated with one or more endpoint devices 215 may make decisions, issue communications or instructions, and take actions that result in the generation of additional data, referred to herein as "session data." This session data is generated and recorded in real-time in association with the session, with some or all data items having one or more associated timestamps. This takes place throughout the session and, when the session is concluded, this data is archived as a collection. Because a timestamp corresponding to the point in real-time when each data event occurred is kept, the operational response 509, as captured in the session data, may be "played back" to later re-experience the response 509 as it originally played out. This feature may be used for audit, analysis, and review, among other purposes.

A wide variety of data may be generated prior to and during the session, and included in the session data. Some of these are described elsewhere in this disclosure. For example, the server 205 is programmed to receive and track and geographic locations of the endpoint devices 215 in the session. As described elsewhere herein, these locations are generally determined by the endpoint devices themselves, such as by using GPS receivers, and then provided to the server 205 over a telecommunication network 207. The session data may include an indication of the received geographic coordinates for each endpoint device 215 in the session, along with one or more timestamps for each coordinate. A timestamp may be generated and transmitted by the endpoint device 215 itself, and/or when the server 205 received the coordinate, for example. Thus, when the session data is later examined, the location of each endpoint device 215 at various points in time over the course of the operational response 509 may be reviewed or replayed in real-time. This allows for a variety of additional analytics to be performed. For example, if an endpoint device 215 is detected at a first geographic coordinate at a first time, and at a second coordinate at a second time, a rate of travel can be calculated.

Additionally, and as further described elsewhere in this disclosure, the server 205 generally is programmed to implement messaging and notification services for providing alerts to one or more endpoint devices 215 over the telecommunications network 207, and/or exchanging messages between endpoint devices 215, such as via direct messages, group chat, and other messaging techniques. Again, one or more timestamps for when some or all of the alerts, messages, or communications were sent or received may be tracked within the session data.

For example, if the user of an endpoint device 215 sends a message during the session, a timestamp when the user sent the message may be recorded. Likewise, a timestamp when the server 205 receives the message may be recorded, and/or a timestamp when the message was retransmitted to other endpoint devices 215, and/or a timestamp when those endpoint devices 215 received the message, may be recorded. This facilitates a full audit of message distribution, showing when each endpoint device 215 sent and/or received the message. Thus, questions arising later concerning the timing of information sharing can be determined by analyzing the session data. However, not all embodiments necessarily require this level of granularity. It may be sufficient in some embodiments to use one timestamp associated with each message (or other event), such as a timestamp when the message was received by the server 205. These types of needs will generally be implementation-specific, based on the business rules or workflow rules of the organization using the system.

Other data also, or alternatively, may be exchanged or stored as session data, such as, but not limited to, data detected or provided as manual or programmatic input to the system via sensors or endpoint devices 215. Geographic location is one subset of such data, but this category is much broader. By way of example, and not limitation, if a motion sensor in the session detects movement, the associated data may be communicated to the server 205 over the telecommunications network 207, along with the timestamp when the sensor detected the movement. Thus, the session data may include the fact of the detected movement itself, data provided by the sensor reflecting the detected motion, and an associated timestamp. To further extend this example, an infrared camera having coverage of the area in which the motion was detected may then automatically activate, and the video feed from the infrared camera may also be provided to the server 205, as new session data, along with a timestamp of when the feed began.

Session data may also be manually provided by a user. For example, in the event of a border patrol unit that has visually identified individuals crossing the border ("crossers"), an individual making that visual identification ("spotter") may count the number of crossers and provide that data to the server 205 via a mobile application on the spotter's endpoint device 215. Other information may also be provided, such as the spotter's estimate of the age, gender, or threat level of the crossers, and so forth.

Still other data may also be included, such as workflow data. This may include, without limitation, task assignment and acceptance data. By way of example, and not limitation, in any given implementation, users of endpoint devices 215 may have an application for using the system and communicating with the server 205. This application, in combination with the server 205, generally implements the workflow for the given operational response, often specific to the context rule assigned to the user. This will often involve the creation and assignment of tasks. A task is usually defined with reference to the particular implementation.

For example, in a neighborhood security application, a citizen user may request an escort to his or her vehicle, creating an unassigned task in the system. The date when the user requested the escort and the creation of the associated task is recorded as session data, possibly with other relevant information for later review and audit purposes, such as the name and location of the requesting user. In an embodiment, a task may be assigned to a specific person or group of people (e.g., based on context role), or may be an open task which can be claimed or accepted by one or more available users in a group in each user's discretion, or may be openly available for all members of a given group or role to participate. In this example, the task may be later accepted by one user in the escort or officer role, the timestamp when the task was assigned to the officer user may also be recorded in the session data, again possibly with other useful information such as, but not necessarily limited to, the identification and location of the accepting officer or escort.

All of this information can be considered session data, including the timestamps, as recorded for later playback and analysis. A wide variety of sensor data may be provided or otherwise made available to the server 205 in association with a session, and that data, or data from other sources, may be stored as session data. The session data, collectively, becomes essentially a virtual digital twin of the actual timeline of the operational response represented by the session, and may include, without limitation, sensor data, data streams or other inputs, communications, decisions, tasks, form data, and location data of end point devices and other data sources. These and other data sources are further described elsewhere in this disclosure.

An aspect of the session concept is that it serves as an organizational tool for a real-world operation, and which provides a framework and structure for efficient communication among, and utilization of, the organizations, subunits, assets, and personnel involved in a response to a precipitating event. The foregoing examples of session data, along with the workflow, decision support, and operational response are all organized through the session. The session essentially provides a virtual "workspace" and uniform interface for all organizations and individuals involved in the response to understand and share a common operational picture of the precipitating event and the current, real-time status of the operational response. This declutters response by reducing the need to continually monitor a variety of disparate point solutions.

As used herein, a precipitating event 503 means a specific event or occurrence, normally taking place in the real world, which generates the need to organize and manage an operational response 509. The event or occurrence is generally related to the business or functional operational goals of the group or organization responding to it. Thus, while it is normally an event taking place in the real world, in certain embodiments and circumstances, events taking place in "cyberspace" could be precipitating events 503 if they otherwise meet the definitional criteria. This type of event is further described elsewhere herein.

By way of example and not limitation, consider an embodiment of the system used by a government agency to monitor a geopolitical border. The agency may be a military unit, border patrol agency, or a private contractor tasked with preventing unauthorized entry or providing humanitarian assistance. A sensor may detect an attempt to cross the border, and provide an alert to the server 205. The attempted border crossing is a precipitating event 503 that necessitates an operational response, and the server 205 would then create a session in response to the event 503 (or, more specifically, in response to receipt of the sensor data 505 indicating the precipitating event 503) for the communications and data 511 sent and shared among various devices to organize and manage an operational response 509 in real-time.

By way of further example and not limitation, consider an embodiment of the system used by a recycling plant to receive deliverables of material for processing. A truck arrives 503 at a loading dock. This could be detected 505 by a sensor at the loading dock, the arrival could be manually noted 505 via an endpoint device 215 by a dockworker, or the truck may itself be equipped with a location sensor (e.g., GPS) connected to the system which tracks the location and provides a notification 505 to the server 205 when the truck has arrived 503. The arrival 503 is a precipitating event 503 for a response 509 by the recycling center, and the server 205 would then create a session in response to the truck arrival event 503. Each truck that arrives may be a separate and independent session, which, as described elsewhere herein with respect to the operational response 509, may involve different endpoint devices 215 and workflows in the operational response 509. For example, a truck arriving with glass may receive a different operational response 509 than a truck arriving with paper, plastic, electronic waste, or biological material.

In certain circumstances, the non-occurrence of an event may itself be a precipitating event 503. By way of example and not limitation, in the above example of a recycling center, consider the circumstance that a truck is scheduled to arrive with a shipment of materials for processing. For example, the server 205 may have access to scheduling data indicating the anticipated arrival, either directly or via a connection or integration with third party software used by the recycling plan to manage and schedule deliveries. When the scheduled time passes and the truck has not been detected or logged as having arrived at the loading dock, the non-arrival at the scheduled time may itself be a precipitating event 503 for an operational response 509 to the non-arrival, and the server 205 would then create a session 507 in response to the non-arrival of the truck.

In general, a precipitating event 503 is a real-world event that motivates an operational response 509, and thus is distinguishable from other types of events that take place only in a virtual or electronic context. For example, in computing, an "event" is an action or occurrence that is recognized by software and generally takes place asynchronously. The systems described herein may also use but are not limited to this concept. For example, when a sensor detects a border crossing (an asynchronous event), the sensor provides data to the server. In a computing sense, the computer receives this data as an "event", but the computing event is not the precipitating event requiring an operational response 509. Instead, the border crossing 503 is considered the precipitating event for purposes of this example.

However, under certain circumstances, a computer event could be considered a precipitating event. For example, consider an embodiment of the system used by a security firm to detect cybersecurity threats in real-time and respond to them. In this context, the "sensor" may be software that monitors network traffic for malicious code or security threats attempting to break into a secured system, and, if any such attempted break-in is detected, the software may notify the server. In this context, the attempted break-in could be considered a precipitating event 503. However, it will be clear to a person of ordinary skill in the art that this type of precipitating event 503 is a specific example dependent on its operational context and is not necessarily generalizable to all "computing events" that a computer is programmed to handle in program flow. Said differently, the precipitating event 503 has an operational context independent from the implementation of the system. It is an event that would happen whether or not the system described herein was implemented or available to coordinate an operational response 509.

A session is also defined by a terminal point or endpoint, which may also be described as "closing" or "ending" the session. The "endpoint" is, in real world terms, when the operational response 509 to the precipitating event is concluded and the event 503 has been addressed or responded to, so far as its nature requires. The event 503 could re-occur, which would precipitate the formation of a new, separate session 507 for the response 509 to the re-occurrence. Alternatively, other events 503 may take place (or fail to take place) related to the precipitating event 503 which require a further operational response 509, in which case a new session could again be formed 507 to organize the further response 509. A session may be closed automatically or manually, depending on the nature of the implementation of the system.

By way of example and not limitation, consider again the embodiment of a system used by a government agency to monitor a geopolitical border, and organizing an operational response 509 to a sensor detecting a border crossing 503. Once the session is formed 507, the operational response 509 begins, and a patrol is dispatched to the coordinates associated with the sensor alert. Upon arrival, the patrol may determine that the sensor was triggered by wildlife, report back accordingly, alert appropriate commanders or other authorities, and the session may be closed 515. Alternatively, the patrol may find that the sensor is faulty or requires service, or may find an attempted unlawful crossing and detain the suspects. The users, and their roles, in the response 509 may all be tracked and updated as described elsewhere herein, and the system may be used to ensure that information is promptly conveyed in real-time to those who require it.

For example, when the sensor detects the border crossing 503, the timestamp and associated data provided by the sensor may be received at the server 205 and stored in the session. Likewise, the date when the operational response begins (e.g., the task to investigate the crossing is assigned to a patrol unit) is also recorded with a timestamp, along with an identification of which patrol unit received the task. Similarly, the time when the patrol unit reports that it has departed from its post may be stored in the session data, and the detected geographical location of endpoint devices carried by the members of the patrol unit are also updated over time as the patrol unit approaches the coordinates associated with the sensor event. Similarly, upon arrival, the patrol may check in, or the arrival may be automatically determined by observing the diminishing distance between the detected location of the endpoint devices 215 and the detected location of the border crossing. Again, all of this data is stored in the session data, along with a timestamp of when it occurred. Once the patrol identifies that the sensor appears to have been triggered by wildlife, the date of that determination may further be stored in the session data, along with the date at which commanders were alerted, and instructions were relayed for the patrol to return to their post. Later, when assessing the effectiveness of the response, or performing such other analysis as may be needed, these timestamps, and the associated data, can be used to evaluate how the response was conducted, which in turn may be used to refine processes, workflows, command structures, and otherwise modify or improve the operational response to preserve assets, resources, personnel, and increase operational effectiveness.

By way of further example and not limitation, consider the embodiment of a truck arriving at a loading dock of a recycling plant. Once the session begins 507, various operational responses 509 may take place (e.g., weighing the vehicle, alerting a receiving yard, directing the truck to the receiving yard, unloading the material, entering records and notes, and weighing the empty again to calculate the mass unloaded), after which, the response 509 is over, and the session may be closed 515.

In the circumstance of a scheduled truck not arriving, the session could commence 507 and consist of little more than alerting a scheduling director, or the customer, of the missing vehicle, or may include actively tracking the vehicle via a mobile device of the driver to determine when it may be expected to arrive. In this sense, the non-arrival could launch a first session 507 to deal with the non-arrival of the truck and route it to the proper destination. For example, if the driver is lost or unwell, or the truck has experienced manual failure, appropriate personnel can be added to the session to provide real-time situational awareness as described herein. Once the truck arrives, the first session can be closed 515, and a new, second session begun 507 for the operational response 509 to the truck's arrival. Thus, a chain of sessions could occur in sequence.

Additionally, it is possible for a precipitating event to give rise to multiple sessions. For example, suppose the truck experiences poor weather conditions and the driver loses control, causing the truck to collide with a bridge embankment. A session may be created 507 to manage the medical condition of the driver, and another may be created 507 to manage the collision. Alternatively, both events could be managed within a single session, with the roles of the participants being used to filter messaging and minimize noise ratio.

In a still further embodiment, a session could be split. In this example, the geolocation coordinates relevant to both sessions are the location of the truck and driver, so both medical and engineering staff could share a session to route personnel to the correct location. However, once medical staff arrive and remove the driver, they may no longer require information about the location or status of the vehicle, and thus could split off into a separate session.

An aspect of sessions is that the precipitating event 503 will ordinarily have various data elements 505 associated with it that are provided to the system to initiate the session. This data 505 typically includes the time the event 503 was detected as taking place and the location where the event 503 was detected as taking place. Additionally, the data 505 may include an indication of the relevant people/personnel or units/groups of people/personnel to which the event 503 applies, and possibly other data as well that is generally event-specific and will vary from embodiment to embodiment. This collection of data 505 is generally referred to herein as the "precipitating event data," and it becomes part of the session data once the session is formed. It is normally shared, via the system, with the appropriate team members based on matching roles with the indicated nature of the event 503.

Another aspect of the session is that it may have a type identifier, and the session type may change over the course of the session as new information is acquired and shared. This may also cause certain team members, equipment, or other resources to be added and/or dropped from the sessions as the operational response proceeds 509. This is another element of situational awareness, and allows for the more effective, efficient, and targeted deployment of resources based on events actually taking place in real-time. The session type may be set as a default and can change over the course of the session, and can be used to filter which individuals or groups of users (e.g., context roles) are included in the session, and what types of data may be collected and included in the session data.

The real-time aspects can be implemented in a number of ways to facilitate the sharing of any data, regardless of type, with all participants in the session. Again, this may be filtered or limited based upon whether the nature of the information is appropriate for sharing for each user based on the user's context role identifier. For example, when an end-user device sends or receives a message, or new data, the server, upon received, immediately relays this update to all impacted client connections, eliminating the need for the client device to refresh the application, page, view, or to engage in periodic "fetching" of new data from the server. Instead, the data at the client is updated live and in the real-time throughout the session.

For example, suppose a user's geographic location is updated, and the client transmits the updated geographic location to the server. Upon receive, the server immediately determines which connected devices in the session should receive that data update. This may be done based on context role identifier for the user whose geolocation is being updated, or for other users in the session, and/or may be based upon data sensitivity/security settings. The server then transmits the updated data to each end-point device to be updated, as rapidly as the inherent processing limitations of the hardware and network infrastructure permit. This means that all connected devices can receive real-time updates. Likewise, if an IoT device in the session provides an update, the same method applies. There a number of ways to implement this feature, ranging from multiplexing to multithreaded or multiprocess communication and data sharing with each thread or process managing a one or more network connections in the session.

Figure 6:
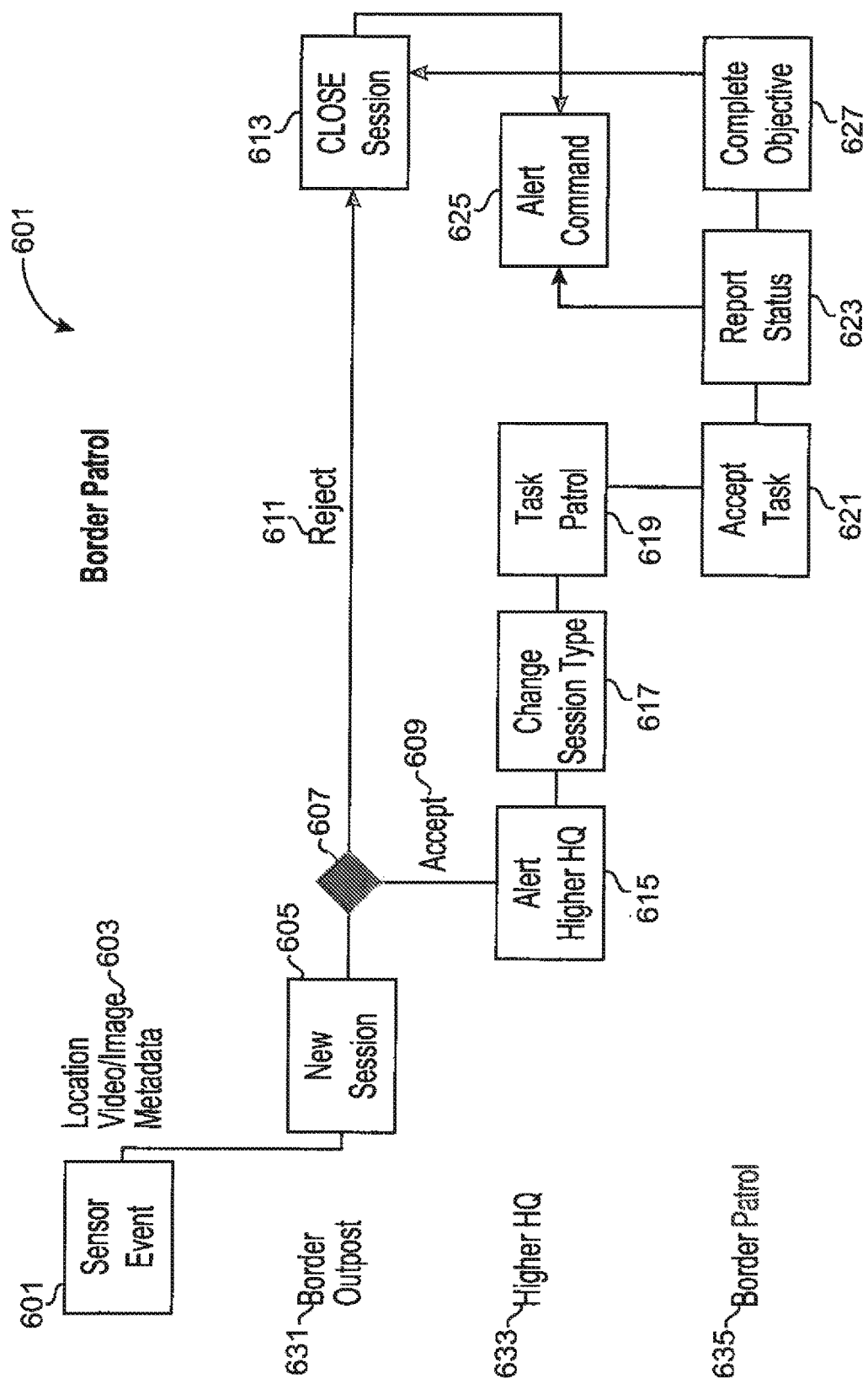
FIG. 6 depicts an exemplary embodiment of a session in a border patrol implementation.
Figure 7:
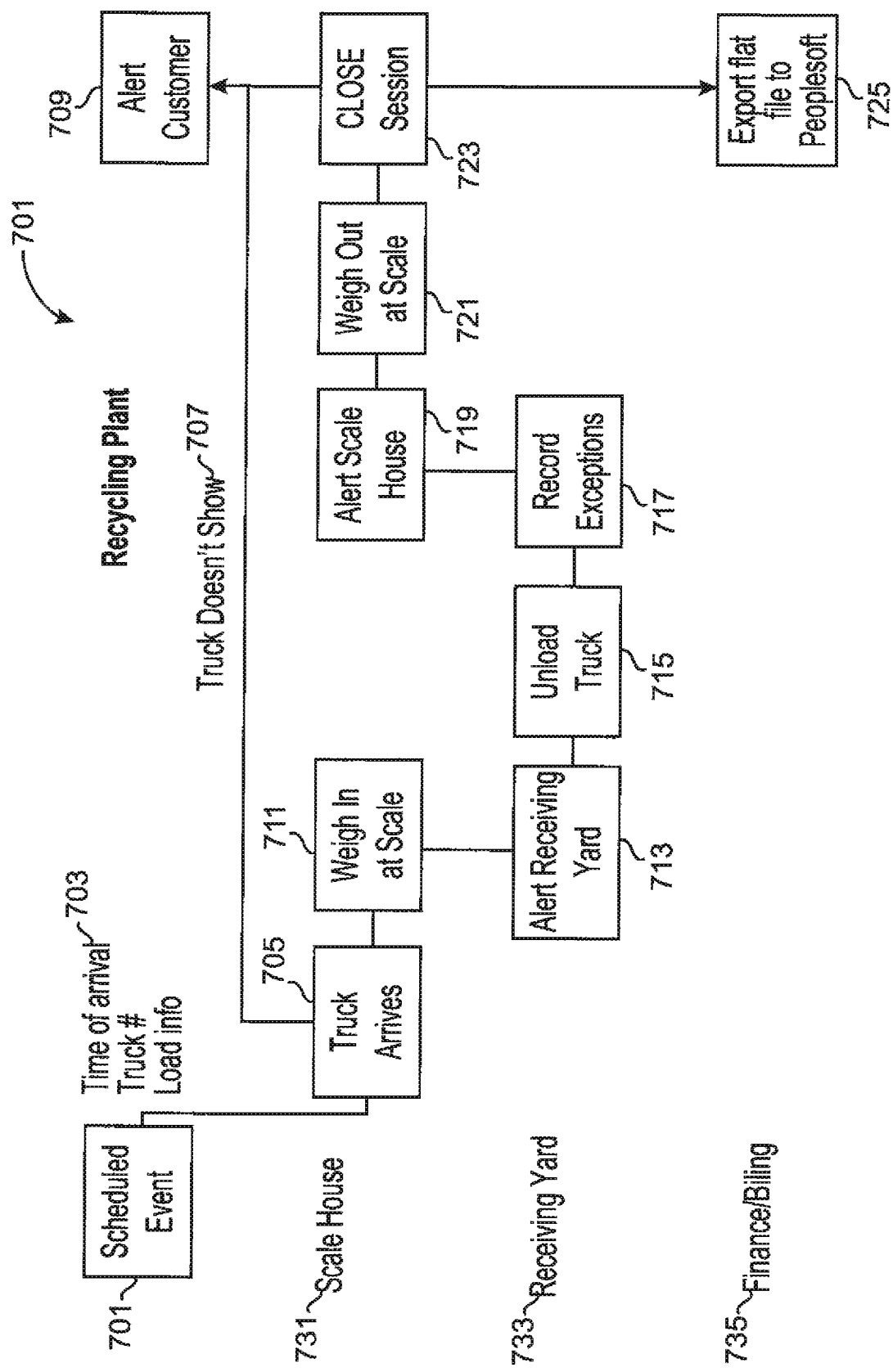
FIG. 7 depicts an exemplary embodiment of a session in a recycling center implementation.
Figure 8:
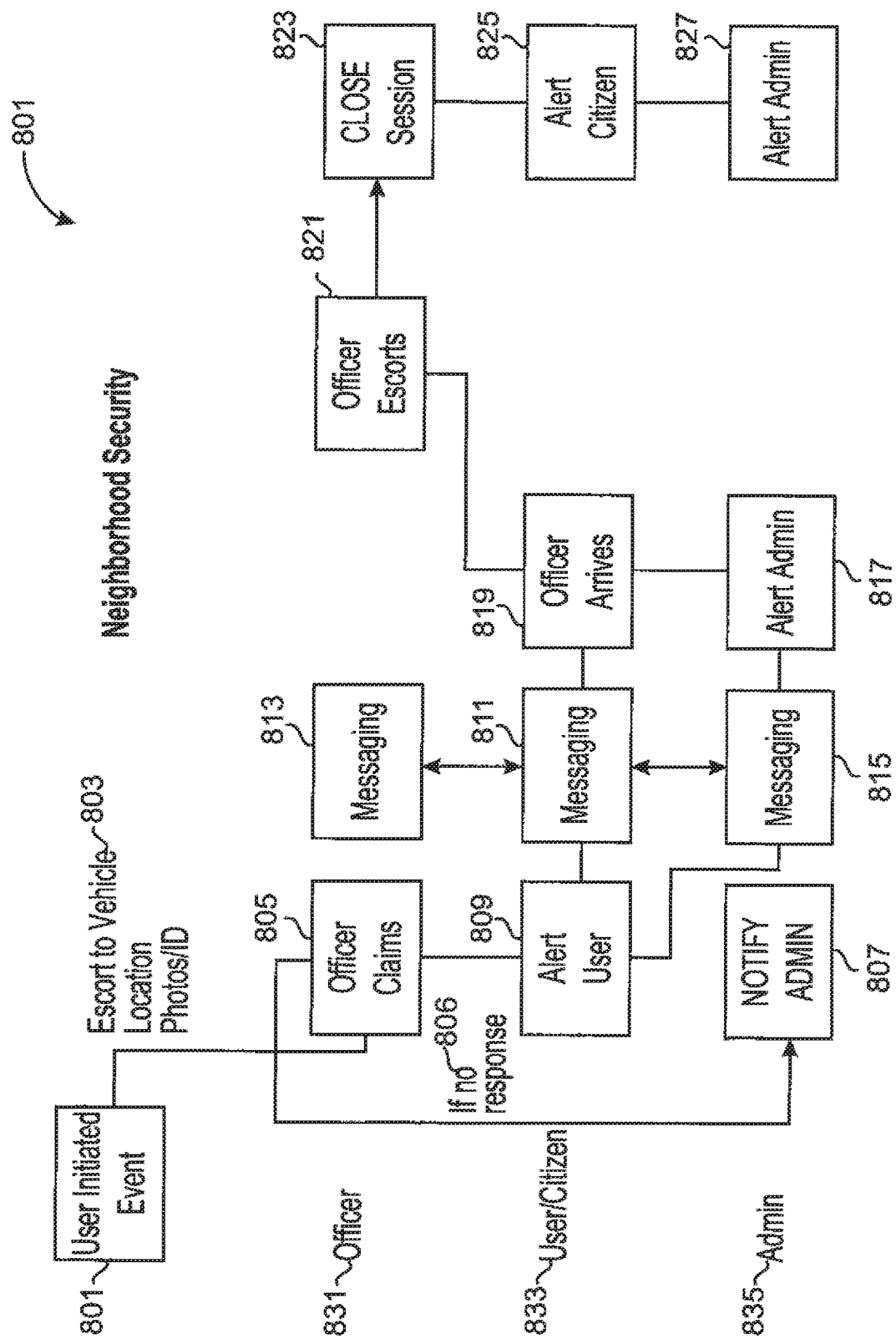
FIG. 8 depicts an exemplary embodiment of a session in a neighborhood security implementation.

The following description with reference to FIG. 6, FIG. 7, and FIG. 8 is provided to teach by way of non-limiting illustrative examples. FIG. 6 expands upon the embodiment of a border patrol implementation described elsewhere herein. In the depicted embodiment of FIG. 6, an implementation of the system is used to respond to sensor events 601 associated with monitoring a geopolitical border. As shown in FIG. 6, this implementation comprises three different user roles or groups as follows: border outpost 631, headquarters 633, and border patrol 635. As described elsewhere herein, each of these user roles will have one or more endpoint devices 215 associated with a user assigned to each role. By way of example, and not limitation, military personnel staffing a border outpost may have endpoint devices 215 with user information in the server 205 identifying that such users have the user role "border outpost" 631. Thus, messages, data, and other communications and information exchanged in the session may be associated with the border outpost 631 role, and users associated with the border outpost 631 role will receive that information. However other users who have other roles, such as headquarters 633 or border patrol 631, need not receive or have access to those same communications.

In the depicted embodiment, a sensor event 601 takes place. Such an event 601 may be automatically or manually generated. For example, the border may have cameras, infrared sensors, drones, motion sensors, or other ways of detecting an attempted border crossing. Alternatively, a human may visually identify an attempted crossing and manually enter data 603 for the event. In the event of a human spotter, there may be no sensor event 601.

Generally, data generated automatically by a sensor will be included the precipitating event data 603 and will be used to form a new session 605. In this example, the new session data 603 is first sent to the users associated with the border outpost 631 role. This is for operational reasons. The users associated with that role 631 are closest, geographically and operationally, to the underlying event, and in the best position to provide more information in a real-time response.

The border outpost 631 users may review the precipitating event data 603 and make a threshold determination 607 of whether further action is needed. For example, if the border outpost 631 users determine from the precipitating event data 603 that no attempted crossing has taken place (for example, a motion sensor was triggered by wildlife, which can be seen in the video footage), then the session may be rejected 611 by that group, and then closed 613. As described elsewhere herein, the data 603 and decision 607 are encapsulated within the session data and can be audited or reviewed later to confirm that the decision 607 was appropriate. For example, if the video is fuzzy or indiscernible, further training may be required to educate border outpost 631 unit that, when in doubt, the session should be accepted 609.

If the session is accepted 609, additional communications are sent to a different user group, which is headquarters 633 in the depicted embodiment. In this case, the precipitating event data 603, along with any additional information or data (i.e., session date) generated by the border outpost 631 users in making the decisions 607, may also be added to the session and shared with headquarters 633. As described elsewhere herein, this may be done by associating the individual data elements in question with both the border outpost 631 role and the headquarters 633 role. Again, at this point, there is no need for a border patrol unit 635 to be involved.

Leadership personnel in the headquarters 633 role may then review the available session data and confirm that an operational response is required. Additionally, headquarters 633 may determine what type of border patrol unit 635 is required based upon the available session data. This may further require a change of session type 617. For example, if the attempted border crossers appear to be refugees, a humanitarian border patrol may be sent with food, blankets, translators, and so forth. However, if the border crossers appear to be hostile (such as an armed unit), a military force may be sent instead, and the nature of the operational response is very different.

Next, headquarters 633 assigns a patrol task 619 to an appropriate border patrol unit 635. This assigned task 619 then has an associated role of border patrol 635. As will be clear to a person of ordinary skill in the art, the level of granularity of the role type will depend upon the implementation and the customization of the particular user. For example, the patrol task 619 may be directed to only certain types of border patrol units 635. That is, the implementation may have a humanitarian border patrol unit, as well as a military border patrol role, and the patrol task 619 may be assigned to one or the other, meaning that users that have a humanitarian border control unit type may receive the message, but military border control units may not.

Next, the task 621 is accepted by a responding border patrol unit 635, which then conducts the operational response. This will of course vary from embodiment to embodiment depending upon the nature of the precipitating event. The nature of the response will be informed by the precipitating event data 603 plus any additional session data developed by the border outpost 631, headquarters 633, or other users.

During the response, users in various roles may have access to some or all of the shared data and information in the session. This may include maps, real-time locations of border outpost 631 users, headquarters 633 users, the border patrol 635, and updates provided by sensors or other events. For example, if a different sensor subsequently detects motion, that information may be added to the session, along with the geolocation of the sensor in question. This may in turn involve the addition of other users. For example, if the initial sensor event was at a first outpost, but a second sensor event is detected at a second outpost, staff at the second outpost may be added to the session. The border patrol unit 635 may also issue frequent status reports 623 which may then be relayed to headquarters 633 for analysis and decision support.

Once the objective is completed 627, the session can be closed 613. The objective is completed 627 based on the operational definitions applicable to the particular response. For example, in a humanitarian interception, the objective may be considered completed when the refugees are all accounted for, identifying information has been acquired, and the refugees are safely en route to an immigration center. By way of contrast, in a hostile interception involving an armed incursion, the objective may be deemed completed only when the hostiles have been driven back across the border or neutralized.

Once the objective is completed 627 and the session is closed 613, all of the events that took place during the session are archived into one logical encapsulation of the session. Events may have associated timestamps and locations, and session data collected during the session, including map and location updates, exchanges of chat messages, instructions, and so forth. Thus, it is possible for a computer program to access the archived session data and "play back" the session to experience it after the fact as it occurred in real-time. This allows for assessments and auditing.

Referring now to FIG. 7, the embodiment of a recycling plant is described in further detail. In the depicted embodiment of FIG. 7, the roles are a scale house 731, a receiving yard 733, and a finance/billing department 735. In this embodiment, a scheduled event 701 in the form of an expected recycling truck arriving with material to unload is present. In this embodiment, the vehicle arrives at the scheduled time 701, and a user at a loading dock may capture this information 703. For example, a truck number, driver identifier, and time of arrival may be recorded 703. This may be done using the dockworker's endpoint device 215. Additionally, or alternatively, an endpoint device 215 of the driver may be tracking the driver's location in real-time, and when the truck is detected as having arrived at the loading dock, some or all of this information may be generated automatically 703. However it is acquired, this data becomes the precipitating event data 703 for the session. Once the truck arrives 705, it may weigh in at a scale house 731 to determine the total mass of the truck and material in it. This may then trigger a message 713 to the receiving yard 733 to expect an incoming truck for unloading. As described elsewhere herein, this is done by a message being sent 713 to users associated with the role receiving yard 733. This in turn reduces the need to notify other users who have no immediate operational need to respond to the arrival of the truck 705. The truck may then proceed to the receiving yard for unloading 715, and receiving yard 733 users may enter additional data into the system, such as recording exceptions 717. When complete, a receiving yard 733 user may enter a message 719 to the scale house 731 group that the truck is returning for weigh out. After the truck has weighed out 721 at the scale house, the session may be closed 723.

Alternatively, if the truck does not arrive 707 as expected, an alert may be sent to a customer 709 using the system, or to a person external to the system. In this embodiment, a session may or may not be created depending upon the preferences of the users. Similarly, other post-session processing may be performed. In the depicted embodiment, the data indicating what was received may be exported to a third party system 725 for further processing, such as invoicing, environmental analysis, and so forth.

Referring now to FIG. 8, an embodiment of the systems and methods described herein for implementing a neighborhood security program is shown. In the depicted embodiment, a session is used to track the event of a citizen 833 in the neighborhood desiring an escort to his or her vehicle. As will be clear to a person of ordinary skill in the art, there are any number of different types of sessions that could take place in a neighborhood security context, and this is but one example of a session that could be used.

In the depicted embodiment, the precipitating event 801 is the desire by a citizen to be escorted to a vehicle. The citizen in question may have access to the system directly, and may submit a request 801 as a user. Alternatively, the citizen 833 may have a mobile device application, phone number, or system to place the request. An integration layer between that system and the systems and methods described herein may be used to connect the citizen 833 to the neighborhood security team.

In the depicted embodiment of FIG. 8, the user initiated event 801 is the precipitating event. The precipitating event data 803 includes a request for the escort to the vehicle, which may include the current location of the citizen 833 for the vehicle in question (if known), and potentially other identifying information, such as a photo of the citizen, vehicle make and model, the citizen's name and address, and so forth. This precipitating event data 803 is then provided to users in the officer 831 role. In this embodiment, no particular officer is automatically assigned to the task. Instead, a user in the officer 831 role may claim 805 the escort task. If there is no response 806, then a message may be sent 807 to users in the admin 835 role to notify them of an unfilled request. The admin 835 users may then take further action (not depicted in FIG. 8).

If an officer 831 does claim 805 the task, a message is then sent 809 to the citizen. This message may include further session data, such as the name and location of the officer, a photo of the officer, and other information that may be helpful to the citizen. For example, this information may include the number of escorts the responding officer has previously provided. The officer 831 may then make his or her way to the citizen seeking the escort. This may be done using a map displayed on the endpoint devices 215 of the officer and citizen, which updates the location of each in real-time. Additionally, messaging 811, 813, 817 may be provided among the officer and citizens to facilitate a meeting, or communicate other potentially useful information. For example, if the citizen is in a crowded location, the citizen may provide details about the color of the citizen's clothing, or other distinguishing information.

Eventually, the officer arrives 819 at the location of the citizen, and an alert is then sent 817 to the admin 835 role to indicate that the officer has rendezvoused with the citizen. The officer 831 may then escort 821 the citizens to the vehicle, at which point the session may be closed 823 by the officer. An alert 825 may be further sent to the citizen and/or administration 827 to confirm safety.

In each of these cases, the data generated before and during the session (i.e., session data) is recorded and archived and accessible as an encapsulated session for auditing and review purposes. For example, in the prior example, if the citizen had a complaint about the conduct of the officer, the session data could be consulted to determine where the response may have gone wrong. For example, suppose the citizen complained that the officer showed an inappropriate level of personal interest in the citizen, and took a circuitous path to the vehicle to extend the duration of the escort. The updated mapping data of the location of the endpoint devices of the officer and citizen after the officer arrived could be "played back" or otherwise examined in the session data to determine whether this is in fact the case. If the path indicates that the officer had a shorter route to take, the officer could then be interviewed and questioned about the incident.

Typically, because session data is usually received at some point by the server 205, the encapsulated or archived session data is initially created at the server 205. However, in an embodiment, this data may then be transferred or copied elsewhere for later review and analysis. Further, it is contemplated herein that software may be provided on a mobile device, or other computer system, for the "playback" of the session data in real-time. Conceptually, the session data can be thought of as functioning as a "DVR" for operational response. A playback application could provide common controls that a user would expect in such a system, such as the ability to pause, fast-forward, rewind, slow down, and so forth. Such controls may be provided in graphical user interface elements known in the art. The playback software may be part of the server system 205, or may be a separate software system.

In a further embodiment, it may be possible to revise or edit session data. For example, it is possible that automatically-provided data may not actually belong to the session, and thus should be removed. Alternatively, it may later be determined that other data not originally believed to be related to the session is in fact so related. In such circumstances, such data may be later added to the session to provide a more complete operational picture. For example, if it is later determined that a second attempted border crossing is related to the initial crossing, but this determination is not made until after the operational response concludes, sensor data from the second attempted crossing may be added to the session. Alternatively, or additionally, if a second session was created in response to the second crossing, both sessions could be combined or played back in parallel.

It should also be noted that post-session analysis tools may include the ability to provide additional analytics or insights by performing data analysis after the session is closed. For example, there may be no need during the operational response to determine how far apart, at any given point in time, two different endpoint devices 215 are. However, during playback, a map showing the real-time locations of each endpoint device in the session may be displayed, and updated with the session data for the geographic locations of each device 215. A reviewing user could pause the playback, select two different devices 215 on the map, and then request a distance calculation to see how far apart they are.

Other calculations can also be provided, such as velocity, acceleration, heading, and the like. Although many of these can also be determined in real-time during the response, the need to do so may not be immediately apparent in that time and may only arise after the session has concluded. Thus, the playback tool may provide these and other capabilities for creating additional insights into the available session data. These insights may in turn be added back into the session, so that future playback will show those analytics in real-time.

There are a number of ways that sessions may be implemented and structured. In a very simple example, say a session may be represented as a collection of data having a timestamp representing the start time of the session, and the end time of the session, and containing a structured list of session data events in the form of a reference to the session data itself, along with the corresponding timestamp. For example, if the precipitating event was the detection of a thermal irregularity in a computer system beyond operational tolerances, the timestamp when that irregularity was detected, and a reference to the associated data, may be a first data session element in the list. Next, an alert message may be automatically sent, again, in real-time, to users having the context role of "hardware administrator." Such users may have been automatically added to the session, and the timestamp, and related user ID of each such user may be the next data session element. One such user may then accept the task to investigate the thermal irregularity, and the timestamp of when that user accepted the task, along with a reference to the user's profile data may be the next data session element. Next, the user may enter a note, such as through a mobile device app, indicating that he is en route to the data center where the irregularity was detected. Again, the timestamp associated with that entry may be recorded, along with the note and a reference to the user's profile data. As the user travels to the data center, periodic updates of the geographic location of the user's endpoint device are received at the server and added to the session, along with the associated timestamp. When the user arrives at the data center, he may use a security card to badge in to the server room. The date and time when the user's badge is detected may also be stored as a session data element, along with a reference to the associated badge in data from the security system. The user may then send a message to all users having the context role of "facilities" indicating that the data room appears to have a malfunctioning cooling system, and the temperature is unusually hot. The timestamp of this message, along with the identification of all users in the facilities group who received it may then be added to the session data. Additionally, the user ID of each user in the facilities context role may also be added to the session, and recorded as session data elements. When a member of the facilities context role group responds to accept the task of investigating the cooling system, this may also be recorded. As will be clear to a person of ordinary skill in the art, a lengthy series of communications, events, and data elements, can be added to the session in this fashion, in each case using a generic data container having a timestamp and a reference or pointer to the associated data element for each event. By way of further example, once it is determined that the cooling system is malfunctioning, temperature readings from the cooling system may also be added to the session on a periodic basis, reflecting the rise or fall of temperature over time. Likewise, if historical records of prior temperature readings exist, they may be retroactively added to the session, along with timestamps (if available) to ensure that all data related to the operational response to the precipitating event is included within the session. Once the session concludes, this data may all be stored, including by storing copies of the referenced data, in an encapsulated form so that analytics may be performed on the session and related session data without altering the original data. This has a number of benefits, including that it preserves the original data elements in native format, and allows multiple different sessions to utilize this same original data, while also allowing each session to perform its own independent analysis and analytics on the data.

A person of ordinary skill in the art will readily understand other techniques that may be used to implement the session concept as described herein.

Although the session concept as described herein is described with reference to certain specific examples, it should be clear that the sessions are not limited to these examples, and can be used in a wide variety of other contexts. Other non-limiting examples include transportation logistics (e.g., de-boarding, re-boarding, fueling, and loading aircraft at commercial or military airports), shipment of cargo (e.g., just-in-time inventory, planned and unplanned routing requirements), and public relations (e.g., emergency responses, public safety, and event planning). Each session, and the accompanying workflows and data elements, will generally be defined by the business or mission context of the implementation of the situational awareness server 205 software, in conjunction with the applications used by the users on endpoint devices 215. Any given implementation may have a single application which presents different functions or data depending on the associate user's assigned context role identifier. Alternatively, a plurality of different applications, such as one specific to each role, may be used. For example, in the neighborhood security program, a security officer may have a different user application (or interface/feature set) than a citizen. These may in turn differ from that used by an administrator managing the neighborhood security system.

Additionally, sessions may track not only events, data, and people, but also other assets as well, such as equipment, consumables, and anything else about which data may be available or provided. For example, this may be done through the use of sensors, such as a GPS transceiver built into a vehicle, or may be manually provided to the server 205 via another endpoint device 215.

As described elsewhere herein, the session data may include any of the kinds of data described in the disclosure that the system is designed or configured to access, share, or otherwise track. This may include, without limitation, audiovisual data, location data, temperature, motion sensors, chat messages, personal messages, phone calls, video streams, and so forth. This data may be provided automatically to the session by a sensor or data source, and/or may be entered or provided manually by one or more users. Additionally, the data that is inherently part of the session, such as the content of chat messages or other communications exchanged via the session, is also stored. Each item of data may have one or more associated time stamps, which can be used to reflect when the data was generated, shared, accessed, or viewed, and by extension to reconstruct the entire conduct of the operational response.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A method for organizing and managing an incident response comprising:
   providing a server computer running situational awareness software;
   providing an endpoint device of a user, said endpoint device having application software for communicating with said situational awareness software;
   at said server computer:
      associating an identifier with said user;
      associating a first context role identifier with said identifier; and
   said endpoint device transmitting to said server computer, at a predetermined frequency, a current geographic location of said endpoint device;
   detecting the occurrence of a precipitating event associated with an event context;
   at said server computer, receiving an indication of said detected precipitating event and precipitating event data about said detected precipitating event, said precipitating event data including a geographic location of said precipitating event;
   at said server computer, beginning a session for said detected precipitating event, said session including said received precipitating event data;
   at said server computer, determining said endpoint device is within a notification threshold distance of said detected precipitating event based on a comparison of said received current geographic location of said endpoint device to said received geographic location of said precipitating event and transmitting to said endpoint device a notification message, the content of said notification message being based upon a comparison of said first context role identifier to said event context of said precipitating event;
   conducting an operational response to said precipitating event;
   receiving, at said endpoint device from said server computer, a set of tasks assigned to said user as part of said operational response;
   during said conducting, said endpoint device transmitting to said server computer, at a predetermined frequency, a current geographic location of said endpoint device while said user performs said assigned set of tasks; and
   at said computer server, terminating said session for said detected precipitating event after said after said operational response is completed.

2. The method of claim 1, further comprising:
   said server associating with each endpoint device in said plurality of endpoint devices a context role identifier for said user of said endpoint device;
   in said conducting, said server exchanging data with one or more of said endpoint devices of said plurality of users about said operational response further comprises said server identifying which one or more endpoint devices in said plurality shall participate in said exchanging data by comparing said context role identifier of said user of said each one or more endpoint devices with an event context associated with said data to be exchanged.

3. The method of claim 2, further comprising:
   said server associating with each endpoint device in said plurality of endpoint devices a context role identifier for said user of said endpoint device;
   in said conducting, said server exchanging data with one or more of said endpoint devices of said plurality of users about said operational response further comprises said server identifying which one or more endpoint devices in said plurality shall participate in said exchanging data by comparing said context role identifier of said user of said each one or more endpoint devices with a session type associated with said data to be exchanged.

4. The method of claim 1, wherein said detecting the occurrence of a precipitating event further comprising a sensor detecting the occurrence of said precipitating event.

5. The method of claim 4, wherein said precipitating event data comprises a detected geographical location of said precipitating event and a timestamp when said precipitating event was detected.

6. The method of claim 5, wherein said precipitating event data further comprises sensor data about said precipitating event collected by said sensor.

7. The method of claim 4, wherein said sensor is selected from the group consisting of: an optical, light, imaging, or photon sensor; a motion or movement sensor; an electromagnetic sensor; an acoustic sensor; an automotive sensor; a chemical sensor; an electrical sensor; a magnetic sensor; a fluid sensor; a radiation sensor; a navigation instrument; an orientation or direction sensor; a pressure sensor; a thermal, heat, or temperature sensor; a force, density, or level sensor; a proximity or distance sensor; and an Internet-of-things device or sensor.

8. The method of claim 1, wherein said storing an archive further comprises storing a timestamp for each of said communications.

9. The method of claim 1, further comprising:
   during said conducting, generating a plurality of additional data sets about said precipitating event and said operational response; and
   said storing an archive further comprising storing said plurality of additional data sets.

10. The method of claim 9, wherein each additional data set in said plurality of data sets further comprises a timestamp associated with the time when the data set was generated.

11. The method of claim 9, wherein said additional data sets comprise one or more data sets selected from the group consisting of: video, still photographs, audio, geographic location, text messages, chat messages, maps, and sensor data.

12. The method of claim 11, wherein said sensor data is generated by a sensor selected from the group consisting of: an optical, light, imaging, or photon sensor; a motion or movement sensor; an electromagnetic sensor; an acoustic sensor; an automotive sensor; a chemical sensor; an electrical sensor; a magnetic sensor; a fluid sensor; a radiation sensor; a navigation instrument; an orientation or direction sensor; a pressure sensor; a thermal, heat, or temperature sensor; a force, density, or level sensor; a proximity or distance sensor; and an Internet-of-things device or sensor.

* * * * *